United States Patent
Zhu et al.

(10) Patent No.: US 11,818,645 B2
(45) Date of Patent: *Nov. 14, 2023

(54) METHOD FOR SENDING END MARKER, DEVICE AND SYSTEM

(71) Applicant: Huawei Technologies Co., Ltd., Shenzhen (CN)

(72) Inventors: Qianghua Zhu, Beijing (CN); Chunshan Xiong, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 274 days.

This patent is subject to a terminal disclaimer.

(21) Appl. No.: 17/234,285

(22) Filed: Apr. 19, 2021

(65) Prior Publication Data

US 2021/0243670 A1     Aug. 5, 2021

Related U.S. Application Data

(63) Continuation of application No. 16/404,154, filed on May 6, 2019, now Pat. No. 10,986,557, which is a
(Continued)

(51) Int. Cl.
*H04W 40/12* (2009.01)
*H04W 76/12* (2018.01)
(Continued)

(52) U.S. Cl.
CPC .......... *H04W 40/12* (2013.01); *H04W 36/12* (2013.01); *H04W 68/005* (2013.01);
(Continued)

(58) Field of Classification Search
None
See application file for complete search history.

(56) References Cited

U.S. PATENT DOCUMENTS 10,133,690 B2 * 11/2018 Solbach ............... G06F 3/0656
10,524,173 B2 * 12/2019 Nagesh Shetigar ........................
H04W 36/023
(Continued)

FOREIGN PATENT DOCUMENTS

CN        101572928 A      11/2009
CN        101572929 A      11/2009
(Continued)

OTHER PUBLICATIONS

3GPP TS 29.162 V12.4.0 (Jun. 2014), 3rd Generation Partnership Project; Technical Specification Group Core Network and Terminals; Interworking between the IM CN subsystem and IP networks(Release 12), 66 pages.
(Continued)

*Primary Examiner* — Phirin Sam
(74) *Attorney, Agent, or Firm* — Conley Rose, P.C.

(57) ABSTRACT

A method for sending an end marker, a device, and a system, where the method includes receiving, by a source access node (AN) through a source path between the source AN and a core-network user-plane device, a first end marker sent by the core-network user-plane device. The method further includes generating, by the source AN, N second end marker(s) based on the first end marker, where N is a number of source data radio bearers (DRBs) corresponding to the source path, and sending, by the source AN, the N second end marker(s) to a target AN through a forwarding path corresponding to the source path.

20 Claims, 14 Drawing Sheets

Related U.S. Application Data continuation of application No. PCT/CN2016/104486, filed on Nov. 4, 2016.

(51) Int. Cl.
  *H04W 68/00* (2009.01)
  *H04W 88/08* (2009.01)
  *H04W 36/12* (2009.01)
  *H04W 76/11* (2018.01)

(52) U.S. Cl.
  CPC ............ *H04W 76/11* (2018.02); *H04W 76/12* (2018.02); *H04W 88/08* (2013.01)

(56) References Cited

U.S. PATENT DOCUMENTS

| | | | |
|---|---|---|---|
| 10,986,557 | B2 * | 4/2021 | Zhu ..................... H04W 36/00 |
| 2009/0061876 | A1 | 3/2009 | Ho et al. |
| 2010/0111041 | A1 | 5/2010 | Im et al. |
| 2011/0255471 | A1 | 10/2011 | Sundell et al. |
| 2012/0076099 | A1 | 3/2012 | Yin et al. |
| 2013/0058308 | A1 | 3/2013 | Jaiswal |
| 2013/0072194 | A1 | 3/2013 | Tooyama et al. |
| 2014/0219198 | A1 | 8/2014 | Chiu et al. |
| 2015/0038143 | A1 | 2/2015 | Kilpatrick, II et al. |
| 2015/0365863 | A1 | 12/2015 | Uchino et al. |
| 2016/0014650 | A1 | 1/2016 | Laganier et al. |
| 2016/0105838 | A1 | 4/2016 | Wang et al. |
| 2016/0127959 | A1 | 5/2016 | Miao et al. |
| 2016/0165499 | A1 | 6/2016 | Xu et al. |
| 2017/0041849 | A1 | 2/2017 | Qin |
| 2019/0268818 | A1 | 8/2019 | Yi et al. |

FOREIGN PATENT DOCUMENTS

| | | |
|---|---|---|
| CN | 101772975 A | 7/2010 |
| CN | 102045802 A | 5/2011 |
| CN | 102438284 A | 5/2012 |
| CN | 102905323 A | 1/2013 |
| CN | 103765955 A | 4/2014 |
| CN | 104661324 A | 5/2015 |
| CN | 105075330 A | 11/2015 |
| EP | 2187664 A1 | 5/2010 |
| JP | 2014528207 A | 10/2014 |
| JP | 5943329 B2 | 7/2016 |
| WO | 2014113190 A1 | 7/2014 |
| WO | 2015188357 A1 | 12/2015 |

OTHER PUBLICATIONS

Qualcomm Incorporated, "User Plane for Handover without WT Change," 3GPP TSG-RAN WG3 Meeting #93bis Sophia Antipolis, France, Oct. 10-14, 2016, R3-162484, 6 pages.

"3rd Generation Partnership Project; Technical Specification Group Core Network and Terminals; General Packet Radio System (GPRS) Tunnelling Protocol User Plane (GTPv1-U) (Release 13)," 3GPP TS 29.281 V13.2.0 (Jun. 2016), 29 pages.

* cited by examiner

METHOD FOR SENDING END MARKER, DEVICE AND SYSTEM

CROSS-REFERENCE TO RELATED APPLICATIONS

This application is a continuation of U.S. patent application Ser. No. 16/404,154, filed on May 6, 2019, now U.S. Pat. No. 10,986,557, which is a continuation of International Patent Application No. PCT/CN2016/104486, filed on Nov. 4, 2016. The disclosures of the aforementioned patent applications are hereby incorporated by reference in their entireties.

TECHNICAL FIELD

The present application relates to a mobile communications system, and in particular, to a method for sending an end marker, a device, and a system

BACKGROUND

NextGen (NG) is short for a next-generation mobile communications system architecture. As shown in FIG. 1, NextGen may include a user equipment (UE), an access node (AN), a core network (CN), and a data network. The CN may be logically divided into two parts: a user plane and a control plane. The control plane is responsible for managing a mobile network. The user plane is responsible for transmitting service data. As shown in FIG. 1, an NG2 is a transmission path between the AN and the control plane of the CN, an NG3 is a transmission path between the AN and the user plane of the CN, and an NG6 is a transmission path between the user plane of the CN and the data network.

The UE, as an entrance for interaction between a mobile user and a network, can provide a basic computing capability and a basic storage capability, display a service window to a user, and receive an operation input from the user of the UE. The NG UE establishes a signal connection and a data connection to the AN using a next-generation air interface technology, to transmit a control signal and service data to a mobile network.

The AN is similar to a base station in a conventional network (for example, a second generation (2G) network to a fourth generation (4G) network). Deployed in a location close to the UE, the AN provides a network access function for an authorized user in a specific region, and can transmit user data using transmission tunnels of different quality based on a user level, a service requirement, and the like. The AN can manage a resource of the AN, provide an access service for the UE as required, and forward a control signal and user data between the UE and the core network.

The CN is responsible for maintaining subscription data of the mobile network, managing network elements of the mobile network, and providing the UE with functions such as session management, mobility management, policy management, and security authentication. The CN provides network access authentication for the UE during attachment of the UE, allocates a network resource to the UE when the UE has a service request; updates a network resource for the UE when the UE is moving; provides a fast recovery mechanism for the UE when the UE is idle; releases a network resource for the UE during detachment of the UE; and provides a data routing function for the UE when the UE has service data, for example, forwards uplink data to the data network, or receives downlink data of the UE from the data network and forwards the downlink data to the AN, in order to send the downlink data to the UE.

The data network provides a service for the UE, and may be a private network, such as a local area network. Alternatively, the data network may be an external network beyond control of an operator, such as the Internet, or the data network may be a dedicated network deployed by an operator.

In an NG mobile network, a widely accepted data path implementation is as follows. A data path includes an NG3 path and an air interface path. The NG3 path may be based on a node (for example, an AN), a UE, a session, a flow, or the like. For example, each UE corresponds to one NG3 path, or each session corresponds to one NG3 path, or each AN corresponds to one NG3 path. The air interface path may include one or more data radio bearers (DRBs). The NG3 path is known to the core network, and is maintained by the control plane of the core network. However, the DRB on the air interface path is unknown to the core network, and the DRB is maintained by the AN.

In the foregoing data path implementation, because the DRB on the air interface path is unknown to the core network, the core network cannot generate a DRB-based end marker. The DRB-based end marker is used to help a target AN sort downlink data on a target DRB. Therefore, in a process of handing over the UE from a source AN to the target AN, the core network cannot send the DRB-based end marker to the target AN, thereby causing downlink data disorder resulting from the handover of the UE.

SUMMARY

Embodiments of the present application provide a method for sending an end marker, a device, and a system, such that when a DRB on an air interface path is unknown to a core network, a target AN can accurately learn about a DRB-based end marker.

According to a first aspect, a method for sending an end marker is provided. The method includes receiving, by a source AN through a source NG3 path between the source AN and a core-network user-plane device, a first end marker sent by the core-network user-plane device, where the first end marker is used to indicate that sending downlink data of a UE on the source NG3 path is completed. The method further includes: generating, by the source AN, N second end marker(s) based on the first end marker, where N is the number of source DRB(s) corresponding to the source NG3 path; and sending, by the source AN, the N second end marker(s) to a target AN through a forwarding path, where the forwarding path is used by the source AN to forward, to the target AN, data of the UE received through the source NG3 path.

With reference to the first aspect, in a first implementation of the first aspect, before receiving, by a source AN through a source NG3 path between the source AN and a core-network user-plane device, a first end marker sent by the core-network user-plane device, the method further includes sending, by the source AN, a first switching request message to the target AN, where the first switching request message carries information about the source DRB(s) of the UE and information about the source NG3 path. The information about the source DRB(s) of the UE includes: quality of service (QoS) information of the source DRB(s), an identifier (ID) of the source DRB(s), and a data category indicator of the source DRB(s). The information about the source NG3 path includes: an Internet Protocol (IP) address and a tunnel ID of the source NG3 path on the source AN, and an IP address and a tunnel ID of the source NG3 path on the core-network user-plane device. With reference to the first implementation of the first aspect, in a second implementation of the first aspect, the method further includes receiving, by the source AN, a first switching acknowledgment message from the target AN, where the first switching acknowledgment message carries an IP address and a tunnel ID of the forwarding path on the target AN.

With reference to the first aspect, in a third implementation of the first aspect, before receiving, by a source AN through a source NG3 path between the source AN and a core-network user-plane device, a first end marker sent by the core-network user-plane device, the method further includes sending, by the source AN, a second switching request message to a core-network control-plane device, where the second switching request message carries the number of the forwarding path and a first container. The first container includes information about the source DRB(s) of the UE and information about the source NG3 path. The information about the source DRB(s) of the UE includes QoS information of the source DRB(s), an ID of the source DRB(s), and a data category indicator of the source DRB(s). The information about the source NG3 path includes an IP address and a tunnel ID of the source NG3 path on the source AN, and an IP address and a tunnel ID of the source NG3 path on the core-network user-plane device.

With reference to the third implementation of the first aspect, in a fourth implementation of the first aspect, the method further includes receiving, by the source AN, a switching command sent by the core-network control-plane device, where the switching command carries an IP address and a tunnel ID of the forwarding path on the core-network user-plane device.

With reference to any one of the first aspect or the foregoing implementations of the first aspect, in a fifth implementation of the first aspect, generating, by the source AN, N second end marker(s) based on the first end marker includes: generating, by the source AN, the N second end marker(s) based on the first end marker and a correspondence between the forwarding path and the source NG3 path; or generating, by the source AN, the N second end marker(s) based on the first end marker and a correspondence between the forwarding path, an ID of the UE, and the source NG3 path, where the first end marker carries the ID of the UE.

According to a second aspect, a method for sending an end marker is provided. The method includes receiving, by a target access node (AN) through a forwarding path, a second end marker sent by a source AN, where the forwarding path is used by the source AN to forward, to the target AN, data of a user equipment (UE) received through a source next-generation (NG3) path, and the forwarding path is in a one-to-one correspondence with the source NG3 path. The method further includes generating, by the target AN, M third end marker(s) based on the second end marker, where M is the number of target DRB(s) corresponding to the forwarding path, and the third end marker is used to sort downlink data of the UE on a target DRB corresponding to the third end marker.

With reference to the second aspect, in a first implementation of the second aspect, generating, by the target AN, M third end marker(s) based on the second end marker includes: generating, by the target AN, the M third end marker(s) based on the second end marker and a correspondence between the forwarding path and the target DRB(s), or generating, by the target AN, the M third end marker(s) based on the second end marker and a correspondence between the forwarding path, an ID of the UE, and the target DRB(s), where the second end marker carries the ID of the UE.

With reference to the second aspect or the first implementation of the second aspect, in a second implementation of the second aspect, before receiving, by a target AN through a forwarding path, a second end marker sent by a source AN, the method further includes: receiving, by the target AN, a first switching request message sent by the source AN, where the first switching request message carries information about a source DRB of the UE and information about the source NG3 path, establishing, by the target AN, the target DRB(s) based on the information about the source DRB; establishing, by the target AN, a target NG3 path based on the information about the source NG3 path; and allocating, by the target AN, a resource to the forwarding path. The information about the source DRB of the UE includes QoS information of the source DRB, an ID of the source DRB, and a data category indicator of the source DRB. The information about the source NG3 path includes an IP address and a tunnel ID of the source NG3 path on the source AN, and an IP address and a tunnel ID of the source NG3 path on the core-network user-plane device.

With reference to the second implementation of the second aspect, in a third implementation of the second aspect, the method further includes sending, by the target AN, a first path switching request message to a core-network control-plane device, where the first path switching request message is used to request to switch an NG3 path, where the first path switching request message carries an ID of the source NG3 path and information about the target NG3 path, and where the information about the target NG3 path includes an IP address and a tunnel ID of the target NG3 path on the target AN.

With reference to the third implementation of the second aspect, in a fourth implementation of the second aspect, the first path switching request message further carries a data category indicator list of the target NG3 path.

With reference to the second aspect, in a fifth implementation of the second aspect, before receiving, by a target AN through a forwarding path, a second end marker sent by a source AN, the method further includes: receiving, by the target AN, a third switching request message sent by a core-network control-plane device, where the third switching request message carries a first container, and the first container includes information about a source DRB of the UE and information about the source NG3 path; establishing, by the target AN, the target DRB(s) based on the information about the source DRB; establishing, by the target AN, a target NG3 path based on the information about the source NG3 path; allocating, by the target AN, a resource to the forwarding path based on the third switching request message; and sending, by the target AN, a second switching acknowledgment message to the core-network control-plane device, where the second switching acknowledgment message carries information about the forwarding path of the target AN. The information about the source DRB of the UE includes QoS information of the source DRB, an ID of the source DRB, and a data category indicator of the source DRB. The information about the source NG3 path includes an IP address and a tunnel ID of the source NG3 path on the source AN, and an IP address and a tunnel ID of the source NG3 path on a core-network user-plane device.

With reference to the fifth implementation of the second aspect, in a sixth implementation of the second aspect, the method further includes sending, by the target AN, a second path switching request message to the core-network control-plane device, where the second path switching request message is used to request to switch an NG3 path. The second path switching request message carries an ID of the source NG3 path, information about the target NG3 path, and an NG2 connection identifier. The information about the target NG3 path includes an IP address and a tunnel ID of the target NG3 path on the target AN. The NG2 connection identifier is used to indicate that handover of the UE is completed.

According to a third aspect, a source AN is provided including a receiving unit configured to receive, through a source NG3 path between the source AN and a core-network user-plane device, a first end marker sent by the core-network user-plane device, where the first end marker is used to indicate that sending downlink data of a UE on the source NG3 path is completed. The source AN further includes: a generation unit configured to generate N second end marker(s) based on the first end marker received by the receiving unit, where N is the number of source DRB(s) corresponding to the source NG3 path, and a sending unit configured to send, to a target AN through the forwarding path, the second end marker(s) generated by the generation unit, where the forwarding path is used by the source AN to forward, to the target AN, data of the UE received through the source NG3 path.

With reference to the third aspect, in a first implementation of the third aspect, the sending unit is further configured such that before receiving, through the source NG3 path between the source AN and the core-network user-plane device, the first end marker sent by the core-network user-plane device, the sending unit sends a first switching request message to the target AN, where the first switching request message carries information about the source DRB(s) of the UE and information about the source NG3 path. The information about the source DRB(s) of the UE includes QoS information of the source DRB(s), an ID of the source DRB(s), and a data category indicator of the source DRB(s). The information about the source NG3 path includes an IP address and a tunnel ID of the source NG3 path on the source AN, and an IP address and a tunnel ID of the source NG3 path on the core-network user-plane device.

With reference to the third aspect, in the first implementation of the third aspect, the sending unit is further configured such that before receiving, through the source NG3 path between the source AN and the core-network user-plane device, the first end marker sent by the core-network user-plane device, the sending unit sends a second switching request message to a core-network control-plane device, where the second switching request message carries the number of the forwarding path and a first container. The first container includes information about the source DRB(s) of the UE and information about the source NG3 path. The information about the source DRB(s) of the IE includes QoS information of the source DRB(s), an ID of the source DRB(s), and a data category indicator of the source DRB(s). The information about the source NG3 path includes an IP address and a tunnel ID of the source NG3 path on the source AN, and an IP address and a tunnel ID of the source NG3 path on the core-network user-plane device.

With reference to the third aspect or the first implementation of the third aspect, in a second implementation of the third aspect, the number of the forwarding path is N, and the generation unit is configured to: generate the N second end marker(s) based on the first end marker and a correspondence between the forwarding path and the source NG3 path, or generate the N second end marker(s) based on the first end marker and a correspondence between the forwarding path, an ID of the UE, and the source NG3 path, where the first end marker carries the ID of the UE.

According to a fourth aspect, a target AN is provided including a receiving unit configured to receive a second end marker sent by a source AN, where the forwarding path is used by the source AN to forward, to the target AN, data of a UE received through a source NG3 path, and the forwarding path is in a one-to-one correspondence with the source NG3 path. The target AN further includes a generation unit configured to generate M third end marker(s) based on the second end marker received by the receiving unit, where M is the number of target DRB(s) corresponding to the forwarding path, and where the third end marker is used to sort downlink data of the UE on a target DRB corresponding to the third end marker.

With reference to the fourth aspect, in a first implementation of the fourth aspect, the generation unit is configured to: generate the M third end marker(s) based on the second end marker and a correspondence between the forwarding path and the target DRB(s); or generate the M third end marker(s) based on the second end marker and a correspondence between the forwarding path, an ID of the UE, and the target DRB(s), where the second end marker carries the ID of the UE.

With reference to the fourth aspect or the first implementation of the fourth aspect, in a second implementation of the fourth aspect, the target AN further includes a first processing unit, where the receiving unit is further configured such that before receiving, through the forwarding path, the second end marker sent by the source AN, the receiving unit receives a first switching request message sent by the source AN, where the first switching request message carries information about a source DRB of the UE and information about the source NG3 path. The first processing unit is configured to: establish the target DRB(s) based on the information about the source DRB; establish a target NG3 path based on the information about the source NG3 path; and allocate a resource to the forwarding path. The information about the source DRB of the UE includes QoS information of the source DRB, an ID of the source DRB, and a data category indicator of the source DRB. The information about the source NG3 path includes an IP address and a tunnel ID of the source NG3 path on the source AN, and an IP address and a tunnel ID of the source NG3 path on the core-network user-plane device.

With reference to the second implementation of the fourth aspect, in a third implementation of the fourth aspect, a sending unit is configured to send a first path switching request message to a core-network control-plane device, where the first path switching request message is used to request to switch an NG3 path, where the first path switching request message carries an ID of the source NG3 path and information about the target NG3 path, and where the information about the target NG3 path includes an IP address and a tunnel ID of the target NG3 path on the target AN.

With reference to the third implementation of the fourth aspect, in a fourth implementation of the fourth aspect, the first path switching request message further carries a data category indicator list of the target NG3 path.

With reference to the fourth aspect or the first implementation of the fourth aspect, in a fifth implementation of the fourth aspect, the target AN further includes a second processing unit, where the receiving unit is further configured such that before receiving, through the forwarding path, the second end marker sent by the source AN, the receiving unit receives a third switching request message sent by a core-network control-plane device, where the third switching request message carries a first container, and where the first container includes information about a source DRB of the UE and information about the source NG3 path. The second processing unit is configured to: establish the target DRB(s) based on the information about the source DRB; establish a target NG3 path based on the information about the source NG3 path; and allocate a resource to the forwarding path based on the third switching request message. A sending unit is configured to send a second switching acknowledgment message to the core-network control-plane device, where the second switching acknowledgment message carries information about the forwarding path of the target AN. The information about the source DRB of the UE includes QoS information of the source DRB, an ID of the source DRB, and a data category indicator of the source DRB. The information about the source NG3 path includes an IP address and a tunnel ID of the source NG3 path on the source AN, and an IP address and a tunnel ID of the source NG3 path on a core-network user-plane device.

According to a fifth aspect, a method for sending an end marker is provided. The method includes receiving, by a core-network user-plane device, a tunnel modification request message sent by a core-network control-plane device, where the tunnel modification request message carries an ID of a source next-generation (NG3) path and information about a target NG3 path, where the source NG3 path is a transmission path between a source AN and the core-network user-plane device, where the target NG3 path is a transmission path between a target AN and the core-network user-plane device, and where the information about the target NG3 path includes an IP address and a tunnel ID of the target NG3 path on the target AN. The method further includes: switching, by the core-network user-plane device, an NG3 path based on the tunnel modification request message; generating, by the core-network user-plane device, a first end marker; and sending the first end marker to the source AN through the source NG3 path, where the first end marker is used to indicate that sending downlink data of a UE on the source NG3 path is completed.

With reference to the fifth aspect, in a first implementation of the fifth aspect, generating, by the core-network user-plane device, a first end marker includes generating, by the core-network user-plane device, the first end marker based on the ID of the source NG3 path, where the number of the first end marker is equal to the number of the source NG3 path. Alternatively, the generating includes generating, by the core-network user-plane device, the first end marker based on a data category indicator list of the target NG3 path, where the number of the first end marker is equal to the number of the data category indicator included in the data category indicator list. Alternatively, the generating includes generating, by the core-network user-plane device, the first end marker based on an ID of the UE and the ID of the source NG3 path, where the first end marker carries the ID of the UE, and where the number of the first end marker is equal to the number of the source NG3 path.

With reference to the first implementation of the fifth aspect, in a second implementation of the fifth aspect, the tunnel modification request message further carries the data category indicator list of the target NG3 path or the ID of the UE.

According to a sixth aspect, a method for sending an end marker is provided. The method includes receiving, by a core-network control-plane device, a path switching request message sent by a target AN, where the path switching request message is used to request to switch a next-generation (NG3) path. Additionally, the path switching request message carries an identifier (ID) of a source NG3 path and information about a target NG3 path, and the information about the target NG3 path includes an IP address and a tunnel ID of the target NG3 path on the target AN. The method further includes: generating, by the core-network control-plane device, a first end marker, where the first end marker is used to indicate that sending downlink data of a UE on the source NG3 path is completed; and sending, by the core-network control-plane device, a tunnel modification request message to a core-network user-plane device, where the tunnel modification request message carries the ID of the source NG3 path, the information about the target NG3 path, and the first end marker.

With reference to the sixth aspect, in a first implementation of the sixth aspect, generating, by the core-network control-plane device, a first end marker includes generating, by the core-network control-plane device, the first end marker based on the ID of the source NG3 path, where the number of the first end marker is equal to the number of the source NG3 path. Alternatively, the generating includes generating, by the core-network control-plane device, the first end marker based on a data category indicator list of the target NG3 path, where the number of the first end marker is equal to the number of the data category indicator included in the data category indicator list. Alternatively, the generating includes generating, by the core-network control-plane device, the first end marker based on an ID of the UE and the ID of the source NG3 path, where the first end marker carries the ID of the UE, and where the number of the first end marker is equal to the number of the source NG3 path.

With reference to the first implementation of the sixth aspect, in a second implementation of the sixth aspect, the path switching request message further carries an NG2 connection identifier, and the NG2 connection identifier is used to indicate that handover of the UE is completed. Alternatively, the path switching request message further carries the data category indicator list of the target NG3 path, and the tunnel modification request message further carries the data category indicator list of the target NG3 path.

With reference to any one of the sixth aspect or the foregoing implementations of the sixth aspect, in a third implementation of the sixth aspect, before receiving, by a core-network control-plane device, a path switching request message sent by a target AN, the method further includes: receiving, by the core-network control-plane device, a second switching request message sent by the source AN, where the second switching request message carries the number of the forwarding path and a first container, and where the first container includes information about a source DRB of the UE and information about the source NG3 path; allocating, by the core-network control-plane device, a resource to the forwarding path based on the number of the forwarding path; sending, by the core-network control-plane device, a third switching request message to the target AN, where the third switching request message carries the first container, and receiving, by the core-network control-plane device, a second switching acknowledgment message sent by the target AN, where the second switching acknowledgment message carries an IP address and a tunnel ID of the forwarding path on the target AN.

According to the method provided in the first aspect or the source AN provided in the third aspect, the first end marker sent by the core-network user-plane device is received through the source NG3 path. Additionally, the DRB-based second end marker is generated based on the first end marker, and is sent to the target AN through the forwarding path, in order to help sort the downlink data of the UE on the target DRB. This resolves a problem that a core network cannot accurately send a DRB-based end marker to a target AN when a DRB is unknown to the core network, thereby avoiding downlink data disorder resulting from handover of the UE.

According to the method provided in the second aspect or the target AN provided in the fourth aspect, the second end marker sent by the source AN is received through the forwarding path, and the target-DRB-based third end marker is generated based on the second end marker, in order to help sort the downlink data of the UE on the target DRB. This resolves a problem that a core network cannot accurately send a DRB-based end marker to a target AN when a DRB is unknown to the core network, thereby avoiding downlink data disorder resulting from handover of the UE.

BRIEF DESCRIPTION OF DRAWINGS

To describe the technical solutions in the embodiments of the present application more clearly, the following briefly describes the accompanying drawings required for describing the embodiments. The accompanying drawings in the following description show some embodiments of the present application, and persons of ordinary skill in the art may derive other drawings from these accompanying drawings without creative efforts.

DESCRIPTION OF EMBODIMENTS

The following clearly describes the technical solutions in the embodiments of the present application with reference to the accompanying drawings in the embodiments of the present application. The described embodiments are merely some but not all of the embodiments of the present application. All other embodiments obtained by persons of ordinary skill in the art based on the embodiments of the present application without creative efforts shall fall within the protection scope of the present application.

Figure 1:
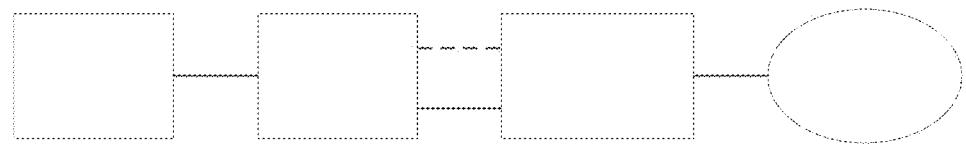
FIG. 1 is an architectural diagram of a next-generation mobile communications system.

It should be noted that, a core-network user-plane device and a core-network control-plane device mentioned in the embodiments of the present application may be integrated in a same core network device, or may be distributed on two independent core network devices, or may be two different network function entities in a data center or on a server. The core-network user-plane device is configured to implement a data routing function of a CN shown in FIG. 1. The core-network control-plane device is configured to: implement mobile network management functions of the CN shown in FIG. 1, for example, maintaining subscription data of a mobile network and managing network elements of the mobile network, and provide UE with functions such as session management, mobility management, policy management, and security authentication.

In addition, because the embodiments of the present application are applied to a scenario of handing over a UE, a source AN is an AN providing a service for the UE before the UE is handed over, and a target AN is an AN providing a service for the UE after the UE is handed over to the target AN. Correspondingly, a source DRB is an air interface transmission path between the source AN and the UE; a target DRB is an air interface transmission path between the target AN and the UE; a source NG3 path is an NG3 path used to transmit downlink data of the UE between the source AN and the core-network user-plane device; and a target NG3 path is an NG3 path used to transmit the downlink data of the UE between the target AN and the core-network user-plane device.

It should be noted that the source NG3 path or the target NG3 path mentioned in the embodiments of the present application may be based on an AN, a UE, a session, a flow, or the like. For example, when the source NG3 path is based on a UE, one UE corresponds to one source NG3 path; or when the source NG3 path is based on a session, one session corresponds to one source NG3 path; or when the source NG3 path is based on an AN, one AN corresponds to one source NG3 path. In addition, all the embodiments of the present application are described using an example in which there is only one source NG3 path. When there are a plurality of source NG3 paths, an implementation method is similar and falls within the protection scope of the present application.

Figure 2:
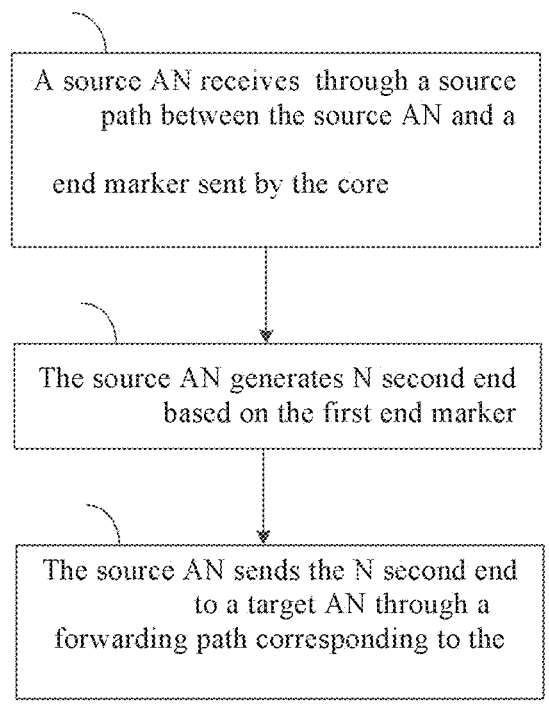
FIG. 2 is a flowchart of a method for sending an end marker according to an embodiment of the present application.

As shown in FIG. 2, an embodiment of the present application provides a method for sending an end marker. Details are described below.

201. A source AN receives, through a source NG3 path between the source AN and a core-network user-plane device, a first end marker sent by the core-network user-plane device.

The first end marker is used to indicate that sending downlink data of a UE on the source NG3 path is completed. The first end marker may be a message, and may carry an IP address and a tunnel ID of the source NG3 path.

The IP address and the tunnel ID of the source NG3 path may include an IP address and a tunnel ID of the source NG3 path on the source AN, and/or an IP address and a tunnel ID of the source NG3 path on the core-network user-plane device.

In an embodiment, the first end marker may be generated by a core network (for example, the core-network user-plane device or a core-network control-plane device). For example, the core network generates the first end marker based on an ID of the source NG3 path, that is, one end marker is correspondingly generated based on an ID of one NG3 path. In this case, the first end marker is an end marker based on the source NG3 path. However, because a DRB is unknown to the core network, the core network cannot generate an end marker based on the DRB. For details about generation of the first end marker, refer to an embodiment shown in FIG. 4 or FIG. 5. Details are not described herein.

An ID of the UE is used to identify the UE, and may be an international mobile subscriber idenity (IMSI), a mobility management entity-temporary mobile subscriber identity (M-TMSI), a globally unique temporary identity (GUTI), or a System Architecture Evolution (SAE) temporary mobile subscriber identity (S-TMSI).

202. The source AN generates N second end marker(s) based on the first end marker.

N is the number of source DRB(s) corresponding to the source NG3 path. When there are a plurality of source DRBs, N may be an integer greater than or equal to 2.

The second end marker may carry an IP address and a tunnel ID of a forwarding path. The IP address and the tunnel ID of the forwarding path may include an IP address and a tunnel ID of the forwarding path on the source AN, and/or an IP address and a tunnel ID of the forwarding path on a target AN.

It should be noted that there may be a preset correspondence between a source NG3 path and a source DRB, and the correspondence may be stored on the source AN. For example, when no switching occurs, downlink data sent on a source NG3 path and received by the source AN is sent to the UE using a source DRB corresponding to the source NG3 path; and uplink data received by the source AN using a source DRB is sent to the core network through a source NG3 path corresponding to the source DRB. In an embodiment, the source DRB corresponding to the source NG3 path may include one or more source DRBs.

203. The source AN sends the N second end marker(s) to a target AN through a forwarding path corresponding to the source NG3 path.

The forwarding path corresponding to the source NG3 path is a forwarding path used to transmit downlink data of the UE that is on the source NG3 path. For example, one source NG3 path may correspond to one or more forwarding paths. The one or more forwarding paths are used to transmit downlink data of the UE that is transmitted on the source NG3 path, as described below.

When the source NG3 path corresponds to one forwarding path, it indicates that the downlink data of the UE that is transmitted on the source NG3 path may be sent to the target AN through the forwarding path. Alternatively, when the source NG3 path corresponds to a plurality of forwarding paths, it indicates that the downlink data of the UE that is transmitted on the source NG3 path may be sent to the target AN through the plurality of forwarding paths.

The forwarding path is used by the source AN to forward, to the target AN, data of the UE received through the source NG3 path. The forwarding path is a transmission channel between the source AN and the target AN, and may be a direct transmission channel, or may be an indirect transmission channel. In an embodiment, the direct transmission channel means that the source AN and the target AN can directly communicate with each other, with no need of forwarding by a third-party device. Additionally, the indirect transmission channel means that the source AN and the target AN cannot directly communicate with each other, with a need of forwarding by a third-party device. The third-party device may be a core-network user-plane device.

Optionally, the number of the forwarding path is N, that is, the number of the forwarding path is equal to the number of the source DRB(s). In other words, the forwarding path is based on the source DRB(s). Further, step 202 may be implemented in the following two manners.

Manner 1: The source AN generates the N second end marker(s) based on the first end marker and a correspondence between the forwarding path and the source NG3 path.

The correspondence between the forwarding path and the source NG3 path may be a correspondence between an ID of the forwarding path and an ID of the source NG3 path, and may be preset in a form of a list on the source AN.

The ID of the forwarding path may be an IP address and a tunnel ID of the forwarding path. The ID of the source NG3 path may be an IP address and a tunnel ID of the source NG3 path.

Further, for the IP address and the tunnel ID of the forwarding path, refer to related descriptions in step 202. For the IP address and the tunnel ID of the source NG3 path, refer to related descriptions in step 201. Details are not described again.

In an embodiment, when receiving the first end marker, the source AN may obtain an ID of the source NG3 path on which the first end marker is transmitted, and may obtain the ID of the forwarding path corresponding to the source NG3 path by checking, using the obtained ID of the source NG3 path, the correspondence between the ID of the forwarding path and the ID of the source NG3 path. Additionally, the source AN may generate, based on the obtained ID of the forwarding path, a second end marker corresponding to the forwarding path, and send the second end marker to the target AN through the forwarding path.

The manner 1 may be applied to a scenario in which the first end marker is an end marker based on a source NG3 path. In this scenario, the source AN generates a source-DRB-based or target-DRB-based second end marker based on the source-NG3-path-based first end marker, and sends the second end marker to the target AN, in order to help the target AN sort downlink data on a target DRB. This avoids downlink data disorder on a target DRB that would otherwise be caused if a core network cannot generate and send a DRB-based end marker to a target AN when a DRB is unknown to the core network.

Manner 2: The source AN generates the N second end marker(s) based on the first end marker and a correspondence between the forwarding path, an ID of the UE, and the source NG3 path, where the first end marker carries the ID of the UE.

The correspondence between the forwarding path, the ID of the UE, and the source NG3 path may be a correspondence between an ID of the forwarding path, an ID of the source NG3 path, and the ID of the UE. For the ID of the forwarding path and the ID of the source NG3 path, refer to related descriptions in the manner 1. Details are not described again.

In an embodiment, when receiving the first end marker, the source AN may obtain the ID of the UE and an ID of the source NG3 path on which the first end marker is transmitted, and may obtain, by checking the correspondence based on the obtained ID of the source NG3 path and the obtained ID of the UE, the ID of the forwarding path corresponding to the source NG3 path of the UE. Additionally, the source AN may generate, based on the obtained ID of the forwarding path, a second end marker corresponding to the forwarding path, and send the second end marker to the target AN through the forwarding path.

It should be pointed out that the manner 2 may be applied to a scenario in which the source NG3 path is an AN-based path. In this scenario, a plurality of UEs may share one source NG3 path. To identify a UE to which an end marker transmitted on the source NG3 path belongs, a first end marker may be generated based on an ID of the UE and information about the source NG3 path. In the manner 2, the source AN generates, based on the first end marker, a second end marker that is based on the source DRB or a target DRB of the UE. This avoids downlink data disorder on a target DRB that would otherwise be caused if a core network cannot generate and send a DRB-based end marker to a target AN when a DRB is unknown to the core network.

It can be learned from the foregoing two implementations that a second end marker is based on a source DRB. Because a source DRB is in a one-to-one correspondence with a target DRB, the generated N second end marker(s) are also based on the target DRB.

Optionally, the number of the forwarding path is 1. That is, a forwarding path is based on a source NG3 path, and one source NG3 path corresponds to one forwarding path. Further, an $i^{th}$ second end marker in the N second end markers generated in step 202 carries a data category indicator of an $x^{th}$ source DRB in the source DRBs corresponding to the source NG3 path, where $1 \leq i \leq N$ and $1 \leq x \leq N$, and a $j^{th}$ second end marker in the N second end markers carries a data category indicator of a $y^{th}$ source DRB in the source DRBs corresponding to the source NG3 path, where $1 \leq j \leq N$, $1 \leq y \leq N$, i, j, x, and y are all integers, i is not equal to j, and x is not equal to y. In an embodiment, a second end marker is in a one-to-one correspondence with a source DRB, and a second end marker carries a data category indicator of a source DRB corresponding to the second end marker.

For example, assuming that N=3, the $1^{st}$ second end marker may carry a data category indicator of the $1^{st}$ first source DRB, the $2^{nd}$ second end marker may carry a data category indicator of the $2^{nd}$ source DRB, and the $3^{rd}$ second end marker may carry a data category indicator of the $3^{rd}$ source DRB.

In this case, step 203 includes sending, by the source AN, the generated N second end marker(s) through the forwarding path.

The N second end marker(s) carry data category indicators of different source DRBs. In other words, the N second end marker(s) are based on the source DRBs. In addition, a source DRB is in a one-to-one correspondence with a target DRB. Therefore, the generated N second end marker(s) are also based on target DRBs.

It should be pointed out that, when a plurality of source NG3 paths of the UE share one source DRB, the method shown in FIG. 2 is still applicable.

According to the method for sending an end marker provided in the foregoing embodiment, the source AN receives, through the source NG3 path, the first end marker sent by the core-network user-plane device. Additionally, the source AN generates the DRB-based second end marker based on the first end marker, and sends the second end marker to the target AN through the forwarding path corresponding to a DRB. This resolves a problem that a core network cannot accurately send a DRB-based end marker to a target AN when a DRB is unknown to the core network, thereby avoiding downlink data disorder resulting from handover of a UE.

Optionally, in a first implementation scenario of the foregoing embodiment, for example, in a scenario in which the source AN and the target AN can directly communicate with each other, before step 201, the method further includes the following step.

200a. The source AN sends a first switching request message to the target AN, where the first switching request message carries information about the source DRB(s) of the UE and information about the source NG3 path.

The information about the source DRB(s) of the UE may include: quality of service (QoS) information of the source DRB(s), an ID of the source DRB(s), and a data category indicator of the source DRB(s). The information about the source NG3 path may include: an IP address and a tunnel ID of the source NG3 path on the source AN, and an IP address and a tunnel ID of the source NG3 path on the core-network user-plane device.

It should be noted that the data category indicator is used to indicate a data category allowed to be transmitted on a source DRB, and may be used to determine the QoS information of the source DRB. In an embodiment, the data category may be obtained through division based on user subscription data, an operator policy, a charging policy, a service attribute, or the like. For example, the data category indicator may be a flow identification indicator (FII), a QoS class identifier (QCI), or a differentiated services code point (DSCP).

In the foregoing implementation scenario, the source AN sends the first switching request message to the target AN, such that the target AN establishes the forwarding path, the target DRB, and a target NG3 path based on the first switching request message.

Optionally, in a second implementation scenario of the foregoing embodiment, for example, in a scenario in which the source AN and the target AN cannot directly communicate with each other, before step 201, the method may further include the following step.

200b. The source AN sends a second switching request message to the core-network control-plane device, where the second switching request message carries the number of the forwarding path and a first container, and the first container includes information about the source DRB(s) of the UE and information about the source NG3 path.

The information about the source DRB(s) may include: QoS information of the source DRB(s), an identifier (ID) of the source DRB(s), and a data category indicator of the source DRB(s). The information about the source NG3 path may include: an IP address and a tunnel ID of the source NG3 path on the source AN, and an IP address and a tunnel ID of the source NG3 path on the core-network user-plane device.

For the data category indicator, refer to related descriptions in step 200*a*. Details are not described again.

Further, with reference to the first implementation scenario or the second implementation scenario, the method may further include the following step.

200*c*. The source AN receives a switching command sent by the core-network control-plane device, where the switching command carries an IP address and a tunnel ID of the forwarding path on the core-network user-plane device.

In the foregoing implementation scenario, the source AN sends the second switching request message carrying the first container to the core-network control-plane device, such that the core-network control-plane device forwards the first container to the target AN, and the target AN can establish the forwarding path, the target DRB, and a target NG3 path based on the first container. The core-network control-plane device may further allocate, on the core-network user-plane device, a resource to the forwarding path based on the second switching request message.

Figure 3:
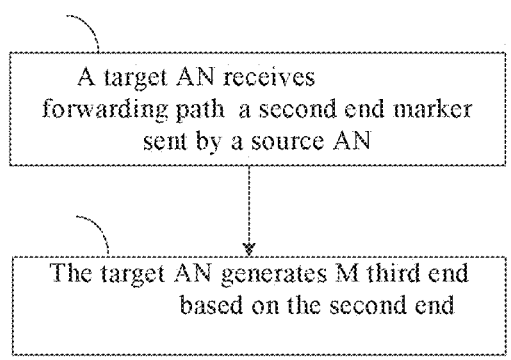
FIG. 3 is a flowchart of another method for sending an end marker according to an embodiment of the present application.

As shown in FIG. 3, an embodiment of the present application provides another method for sending an end marker. Details are described below.

301. A target AN receives, through a forwarding path, a second end marker sent by a source AN.

The forwarding path is used by the source AN to forward, to the target AN, data of a UE received through a source NG3 path. The forwarding path is in a one-to-one correspondence with the source NG3 path.

In an embodiment, a forwarding path is in a one-to-one correspondence with a source NG3 path. In other words, the forwarding path is based on the source NG3 path, that is, one source NG3 path corresponds to one forwarding path. The forwarding path is used to transmit downlink data of the UE received on the source NG3 path corresponding to the forwarding path.

In an embodiment, the second end marker may be generated by the source AN by modifying only path-related information in a first end marker, for example, replacing an IP address and a tunnel ID of a source NG3 path that are in the first end marker with an IP address and a tunnel ID of the forwarding path. Therefore, one second end marker is correspondingly generated based on one first end marker.

For the first end marker, the IP address and the tunnel ID of the source NG3 path, and the IP address and the tunnel ID of the forwarding path, refer to related descriptions in steps 201 and 202. Details are not described again.

302. The target AN generates M third end marker(s) based on the second end marker.

M is the number of target DRB(s) corresponding to the forwarding path. The third end marker is used to sort downlink data of the UE on a target DRB corresponding to the third end marker.

In an embodiment, one target DRB has a third end marker corresponding to the target DRB. When the target AN processes the third end marker, the third end marker is used to help sort downlink data of the UE on the target DRB corresponding to the third end marker. It can be learned that the third end marker is a target-DRB-based end marker.

M may be 1, namely, the number of the target DRB(s) corresponding to the forwarding path is 1 In this case, one forwarding path corresponds to one target DRB. Alternatively, M may be an integer greater than or equal to 2, that is, the number of the target DRB(s) corresponding to the forwarding path is greater than or equal to 2. In this case, one forwarding path corresponds to M target DRBs.

Optionally, step 302 may be implemented in the following two manners.

Manner 1: The target AN generates the M third end marker(s) based on the second end marker and a correspondence between the forwarding path and the target DRB(s).

The correspondence between the forwarding path and the target DRB(s) may be a correspondence between an ID of the forwarding path and an ID of the target DRB(s), and may be preset in a form of a list on the target AN.

The ID of the forwarding path may be an IP address and a tunnel ID of the forwarding path. The ID of the target DRB(s) is used to identify the target DRB(s).

Further, for the IP address and the tunnel ID of the forwarding path, refer to related descriptions in step 202. Details are not described again.

In an embodiment, when receiving the second end marker, the target AN may obtain the ID of the forwarding path on which the second end marker is transmitted, and may obtain an ID of a target DRB corresponding to the forwarding path by checking, using the obtained ID of the forwarding path, the correspondence between the ID of the forwarding path and the ID of the target DRB. Additionally, the target AN may generate, based on the obtained ID of the target DRB, a third end marker corresponding to the target DRB, or generate a third end marker corresponding to the obtained ID of the target DRB.

The manner 1 may be applied to a scenario in which the second end marker is an end marker based on a source NG3 path. The target AN generates a target-DRB-based third end marker based on the source-NG3-path-based second end marker. This avoids downlink data disorder on a target DRB that would otherwise be caused if a core network cannot generate and send a DRB-based end marker to a target AN when a DRB is unknown to the core network.

Manner 2: The target AN generates the M third end marker(s) based on the second end marker and a correspondence between the forwarding path, an ID of the UE, and the target DRB(s), where the second end marker carries the ID of the UE.

The correspondence between the forwarding path, the ID of the UE, and the target DRB(s) may be a correspondence between an ID of the forwarding path, an ID of the target DRB(s), and the ID of the UE. For the ID of the forwarding path and the ID of the target DRB, refer to related descriptions in the manner 1 Details are not described again.

In an embodiment, when receiving the second end marker, the target AN may obtain the ID of the UE and an ID of the forwarding path on which the second end marker is transmitted, and may obtain, by checking the correspondence based on the obtained ID of the forwarding path and the obtained ID of the UE, an ID of a target DRB corresponding to the forwarding path of the UE. Additionally, the target AN may generate, based on the obtained ID of the target DRB, a third end marker corresponding to the target DRB, or generate a third end marker corresponding to the obtained ID of the target DRB.

It should be pointed out that the manner 2 is applied to a scenario in which the source NG3 path is an AN-based path. In this scenario, a plurality of UEs may share one source NG3 path. To identify a UE to which an end marker transmitted on the source NG3 path belongs, a first end marker may be generated based on an ID of the UE and information about the source NG3 path. In the manner 2, the target AN generates, based on a second end marker, a target-DRB-based third end marker. This avoids downlink data disorder on a target DRB that would otherwise be caused if a core network cannot generate and send a DRB-based end marker to a target AN when a DRB is unknown to the core network.

According to the method for sending an end marker provided in the foregoing embodiment, the target AN receives, through the forwarding path, the second end marker sent by the source AN, and the target AN generates the target-DRB-based third end marker based on the second end marker. This resolves a problem that a core network cannot accurately send a DRB-based end marker to a target AN when a DRB is unknown to the core network, thereby avoiding downlink data disorder resulting from a UE handover.

Optionally, in a first implementation scenario of the foregoing embodiment, for example, in a scenario in which the source AN and the target AN can directly communicate with each other, before step 301, the method further includes steps 300a to 300d, as described below.

300a. The target AN receives a first switching request message sent by the source AN, where the first switching request message carries information about a source DRB of the UE and information about the source NG3 path.

The information about the source DRB of the UE may include: QoS information of the source DRB, an ID of the source DRB, and a data category indicator of the source DRB. The information about the source NG3 path may include, an IP address and a tunnel ID of the source NG3 path on the source AN, and an IP address and a tunnel ID of the source NG3 path on the core-network user-plane device.

For the data category indicator, refer to related descriptions in step 200a. Details are not described again.

300b. The target AN establishes the target DRB(s) based on the information about the source DRB.

In an embodiment, the target DRB(s) is established based on the QoS information of the source DRB, for example, a rate, a packet loss rate, and/or a priority. Step 300b may be performed according to conventional approaches. Details are not described.

A source DRB may be in a one-to-one correspondence with a target DRB.

300c. The target AN establishes a target NG3 path based on the information about the source NG3 path.

In an embodiment, the target AN allocates, on the target AN, an IP address and a tunnel ID to the target NG3 path. The core-network user-plane device may send data to the target AN based on the allocated IP address and tunnel ID, and the target AN may send data to the core-network user-plane device based on the IP address and the tunnel ID of the source NG3 path on the core-network user-plane device, in order to establish the target NG3 path. Establishment of the target NG3 path may be performed according to conventional approaches. Details are not described.

300d. The target AN allocates a resource to the forwarding path.

In an embodiment, the allocated resource may include a tunnel ID and an IP address of the forwarding path on the target AN, and the source AN may send data to the target AN using the allocated resource. Because a forwarding path is in a one-to-one correspondence with a source NG3 path, the target AN may allocate, based on the information that is about the source NG3 path and that is carried in the first switching request message, a resource to the forwarding path corresponding to the source NG3 path.

It should be pointed out that a sequence for performing steps 300b to 300d may be adjusted. This is not limited in the present application.

Further, the method may further include the following step.

300e. The target AN sends a first switching acknowledgment message to the source AN, where the first switching acknowledgment message carries an IP address and a tunnel ID of the forwarding path on the target AN.

Further, the method may further include the following step.

300f. The target AN sends a first path switching request message to a core-network control-plane device, where the first path switching request message is used to request to switch an NG3 path, and the first path switching request message carries an ID of the source NG3 path and information about the target NG3 path.

In an embodiment, the information about the target NG3 path may include an IP address and a tunnel ID of the target NG3 path on the target AN. The ID of the source NG3 path may be a tunnel ID of the source NG3 path on the source AN, or may be a tunnel ID of the source NG3 path on a core-network user-plane device. This is not limited.

The first path switching request message may further carry a data category indicator list of the target NG3 path. The data category indicator list includes at least one data category indicator. The at least one data category indicator is used to indicate a data category allowed to be transmitted on the target NG3 path.

Optionally, in a second implementation scenario of the foregoing embodiment, for example, in a scenario in which the source AN and the target AN cannot directly communicate with each other, before step 301, the method further includes steps 300'a to 300'e, as described below.

300'a. The target AN receives a third switching request message sent by a core-network control-plane device, where the third switching request message carries a first container, and the first container includes information about a source DRB of the UE and information about the source NG3 path.

The information about the source DRB of the UE includes: QoS information of the source DRB, an ID of the source DRB, and a data category indicator of the source DRB. The information about the source NG3 path includes: an IP address and a tunnel ID of the source NG3 path on the source AN, and an IP address and a tunnel ID of the source NG3 path on the core-network user-plane device. For the data category indicator, refer to related descriptions in step 200a. Details are not described again.

300'b. The target AN establishes the target DRB(s) based on the information about the source DRB.

300'c. The target AN establishes a target NG3 path based on the information about the source NG3 path.

300'd. The target AN allocates a resource to the forwarding path based on the third switching request message.

In an embodiment, the allocated resource may include a tunnel ID and an IP address of the forwarding path on the target AN, and the core-network user-plane device may forward, to the target AN using the allocated resource, data sent by the source AN.

300'e. The target AN sends a second switching acknowledgment message to the core-network control-plane device, where the second switching acknowledgment message carries an IP address and a tunnel ID of the forwarding path on the target AN.

Further, the method may further include the following step.

300'f. The target AN sends a second path switching request message to the core-network control-plane device, where the second path switching request message is used to request to switch an NG3 path.

The second path switching request message may carry an ID of the source NG3 path, information about the target NG3 path, and an NG2 connection identifier. For the ID of the source NG3 path, refer to related descriptions in step 300f.

The information about the target NG3 path may include an IP address and a tunnel ID of the target NG3 path on the target AN. The NG2 connection identifier is used to indicate that handover of the UE is completed.

Figure 4:
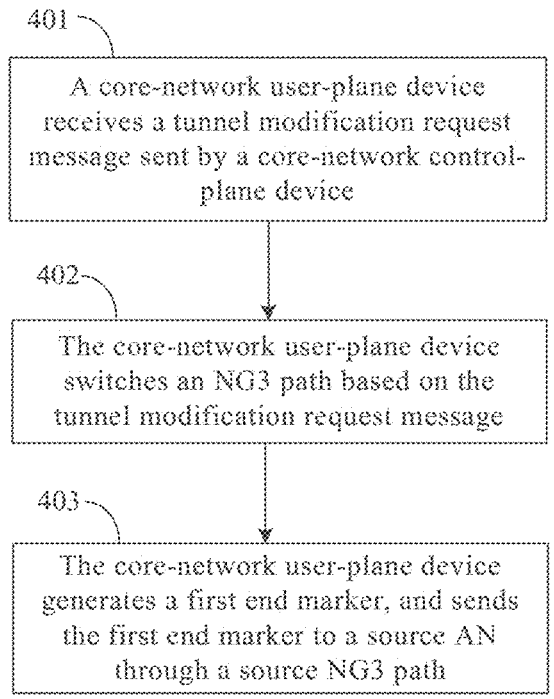
FIG. 4 is a flowchart of still another method for sending an end marker according to an embodiment of the present application.

As shown in FIG. 4, an embodiment of the present application provides still another method for sending an end marker. Details are described below.

401. A core-network user-plane device receives a tunnel modification request message sent by a core-network control-plane device.

The tunnel modification request message carries an ID of a source NG3 path and information about a target NG3 path. The source NG3 path is a transmission path between a source AN and the core-network user-plane device. The target NG3 path is a transmission path between a target AN and the core-network user-plane device. The information about the target NG3 path includes an IP address and a tunnel ID of the target NG3 path on the target AN.

For the ID of the source NG3 path, refer to related descriptions in step 300f. Details are not described again.

402. The core-network user-plane device switches an NG3 path based on the tunnel modification request message.

In an embodiment, the core-network user-plane device modifies, into an IP address and a tunnel ID of the target AN, a stored IP address and tunnel ID of a source AN of the source NG3 path.

403. The core-network user-plane device generates a first end marker, and sends the first end marker to the source AN through the source NG3 path.

The first end marker is used to indicate that sending downlink data of the UE on the source NG3 path is completed.

In an embodiment, that the core-network user-plane device generates a first end marker in step 403 may be implemented in the following manners.

Manner 1: The core-network user-plane device generates the first end marker based on the ID of the source NG3 path, where the number of the first end marker is equal to the number of the source NG3 path.

For example, the number of the source NG3 path is determined based on the ID of the source NG3 path in a path switching request message, and then a corresponding number of the first end marker is generated based on the determined number of the source NG3 path. Alternatively, one corresponding first end marker is generated based on an ID of each NG3 path in a path switching request message.

The first end marker may carry an IP address and a tunnel ID of the source NG3 path.

Manner 2: The core-network user-plane device generates the first end marker based on a data category indicator list of the target NG3 path, where the number of first end marker is equal to the number of the data category indicator included in the data category indicator list.

For the data category indicator, refer to related descriptions in step 200a. For the data category indicator list, refer to related descriptions in step 300f. Details are not described again.

The first end marker may carry an IP address and a tunnel ID of the source NG3 path.

Further, the core-network user-plane device generates the first end marker based on the data category indicator list of the target NG3 path and the ID of the source NG3 path.

In the manner 2, an end marker is generated based on a data category indicator, such that the source AN or the target AN can find a DRB-based path, for example, a forwarding path or a target DRB, based on the data category indicator carried in the received end marker and an ID of a path on which the end marker is transmitted, in order to generate a DRB-based end marker.

Manner 3: The core-network user-plane device generates the first end marker based on an ID of the UE and the ID of the source NG3 path, where the first end marker carries the ID of the UE, and the number of the first end marker is equal to the number of the source NG3 path.

For example, the number of the source NG3 path is determined based on the ID of the source NG3 path in a path switching request message, and then a corresponding number of the first end marker is generated based on the determined number of the source NG3 path.

The first end marker may further carry an IP address and a tunnel ID of the source NG3 path.

It should be pointed out that, for the ID of the source NG3 path and the ID of the UE, reference may be made to related descriptions in step 201. The IP address and the tunnel ID of the source NG3 path may include an IP address and a tunnel ID of the source NG3 path on the source AN, and/or an IP address and a tunnel ID of the source NG3 path on the core-network user-plane device.

In the manner 3, an end marker is generated based on the ID of the UE and the ID of the source NG3 path, such that the source AN or the target AN can find a DRB-based path, for example, a forwarding path or a target DRB, based on the ID of the UE carried in the received end marker and an ID of a path on which the end marker is transmitted, in order to generate a DRB-based end marker.

Optionally, with reference to the three implementations of step 403, the tunnel modification request message may further carry the data category indicator list of the target NG3 path or the ID of the UE.

According to the method for sending an end marker provided in the foregoing embodiment, the core-network user-plane device generates the first end marker in a plurality of manners, and sends the first end marker to the source AN, such that the source AN or the target AN can more flexibly generate a DRB-based end marker. This resolves a problem that a core network cannot accurately send a DRB-based end marker to a target AN when a DRB is unknown to the core network, thereby avoiding downlink data disorder resulting from a UE handover.

Figure 5:
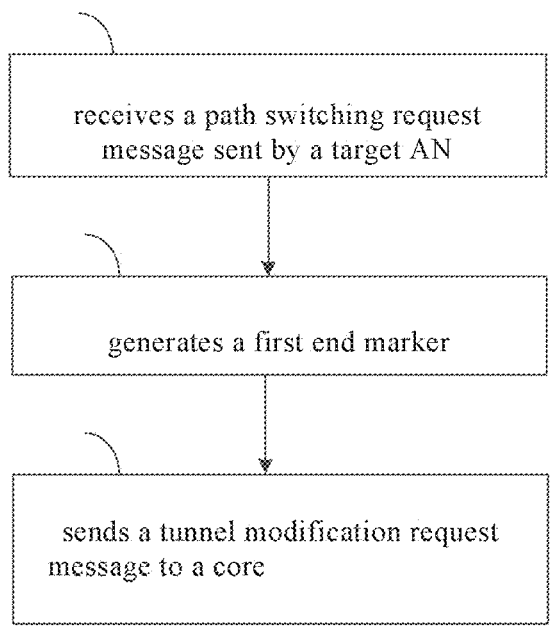
FIG. 5 is a flowchart of yet another method for sending an end marker according to an embodiment of the present application.

As shown in FIG. 5, an embodiment of the present application provides yet another method for sending an end marker. Details are described below.

501. A core-network control-plane device receives a path switching request message sent by a target AN.

The path switching request message is used to request to switch an NG3 path. The path switching request message carries an ID of a source NG3 path and information about a target NG3 path.

In an embodiment, the information about the target NG3 path may include an IP address and a tunnel ID of the target NG3 path on the target AN. For the ID of the source NG3 path, refer to related descriptions in step 300f. Details are not described again.

Optionally, the path switching request message further carries an NG2 connection identifier, and the NG2 connection identifier is used to indicate that the handover of a UE is completed. Alternatively, the path switching request message further carries a data category indicator list of the target NG3 path, and a tunnel modification request message further carries the data category indicator list of the target NG3 path.

For a data category indicator, refer to related descriptions in step 200*a*. For the data category indicator list, refer to related descriptions in step 300*f*. Details are not described again.

502. The core-network control-plane device generates a first end marker.

The first end marker is used to indicate that sending downlink data of a UE on the source NG3 path is completed.

In an embodiment, step 502 may be implemented in the following manners.

Manner 1: The core-network control-plane device generates the first end marker based on the ID of the source NG3 path, where the number of the first end marker is equal to the number of the source NG3 path.

Manner 2: The core-network control-plane device generates the first end marker based on the data category indicator list of the target NG3 path, where the number of the first end marker is equal to the number of the data category indicator included in the data category indicator list.

Manner 3: The core-network control-plane device generates the first end marker based on an ID of the UE and the ID of the source NG3 path, where the first end marker carries the ID of the UE, and the number of the first end marker is equal to the number of the source NG3 path.

It should be pointed out that, for the manner 1, the manner 2, and the manner 3 of step 502, reference may be made to the manner 1, the manner 2, and the manner 3 in the embodiment shown in FIG. 4 respectively. Details are not described again.

503. The core-network control-plane device sends a tunnel modification request message to a core-network user-plane device.

The tunnel modification request message carries the ID of the source NG3 path, the information about the target NG3 path, and the first end marker. For the ID of the source NG3 path and the information about the target NG3 path, refer to related descriptions in the embodiment shown in FIG. 2.

According to the method for sending an end marker provided in the foregoing embodiment, the core-network control-plane device generates the first end marker in a plurality of manners, and sends the first end marker to a source AN using the core-network user-plane device, such that the source AN or the target AN can more flexibly generate a DRB-based end marker. This resolves a problem that a core network cannot accurately send a DRB-based end marker to a target AN when a DRB is unknown to the core network, thereby avoiding downlink data disorder resulting from handover of a UE.

Optionally, in a first implementation scenario of the foregoing embodiment, before step 501, the method further includes steps 500*a* to 500*d*. Details are described below.

500*a*. The core-network control-plane device receives a second switching request message sent by the source AN, where the second switching request message carries the number of a forwarding path and a first container, and the first container includes information about a source DRB of the UE and information about the source NG3 path.

For the information about the source DRB and the information about the source NG3 path, refer to related descriptions in step 300'*a*. Details are not described again.

500*b*. The core-network control-plane device allocates a resource to the forwarding path based on the number of the forwarding path.

In an embodiment, the core-network control-plane device allocates the resource to the forwarding path. The allocated resource may include a tunnel ID and an IP address of the forwarding path on the core-network user-plane device, and the source AN may send data to the core-network user-plane device using the allocated resource.

The number of the forwarding path may be 1, or may be N, where N is the number of the source DRB.

500*c*. The core-network control-plane device sends a third switching request message to the target AN, where the third switching request message carries the first container.

500*d*. The core-network control-plane device receives a second switching acknowledgment message sent by the target AN, where the second switching acknowledgment message carries a tunnel ID and an IP address of the forwarding path on the target AN.

Further, the method may further include sending, by the core-network control-plane device, a switching command to the source AN, where the switching command carries an IP address and a tunnel ID of the forwarding path on the core-network user-plane device.

Further, the method may further include sending, by the core-network control-plane device, a first notification message to the core-network user-plane device, where the first notification message is used to notify the core-network user-plane device that allocating the resource to the forwarding path is completed.

Figure 6A:
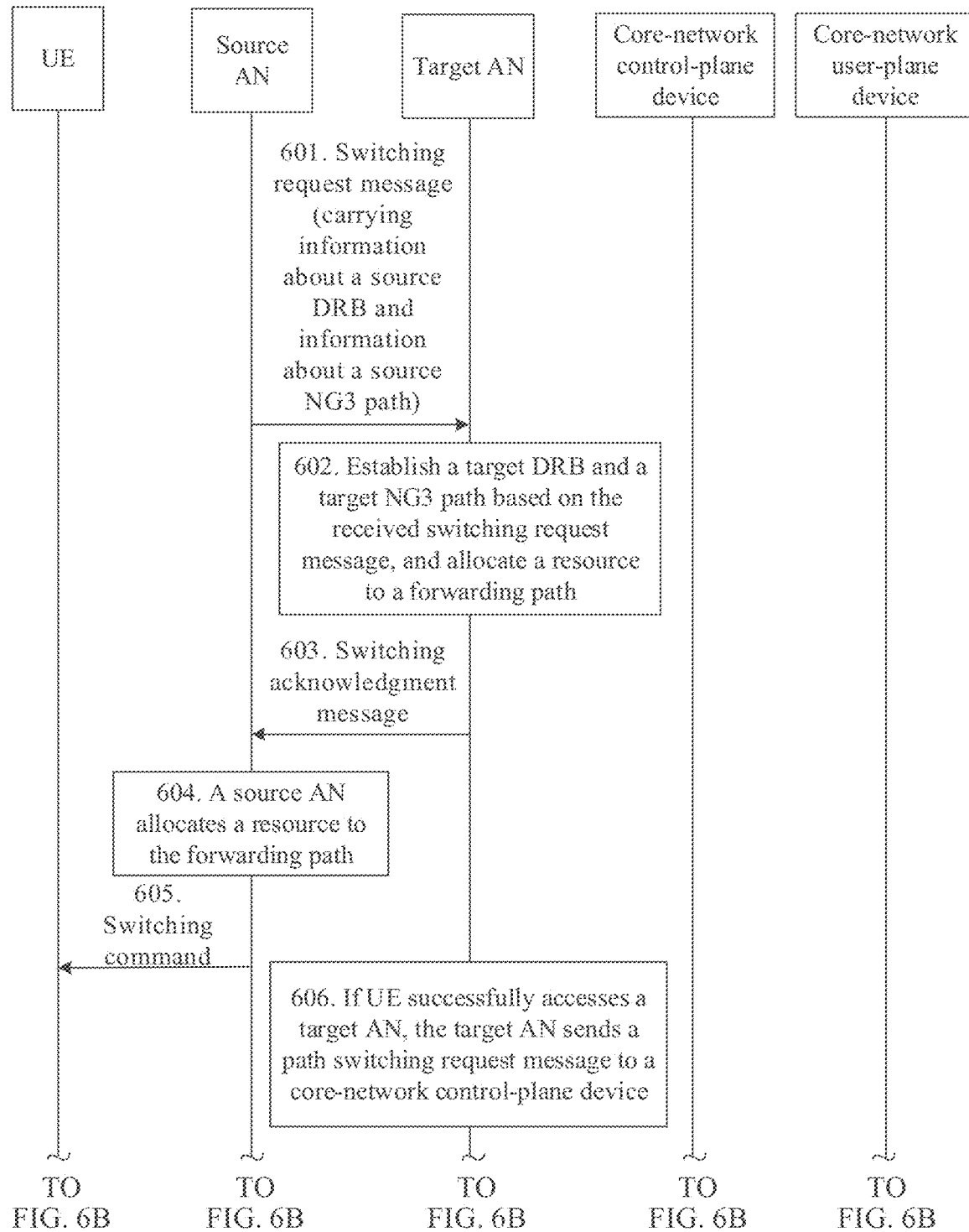
FIG. 6A and FIG. 6B are signaling interaction diagrams of a method for sending an end marker according to an embodiment of the present application.
Figure 6B:
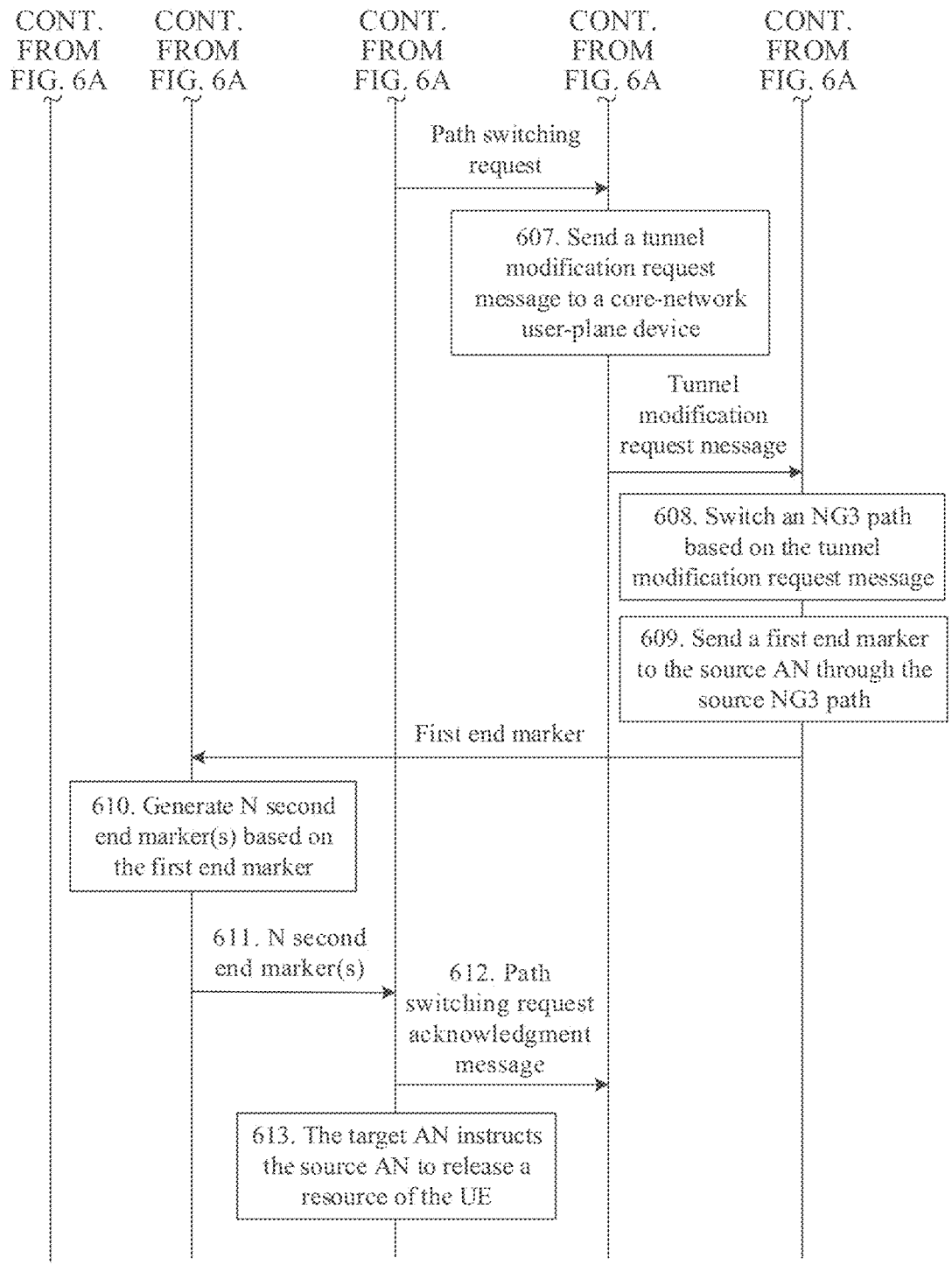

As shown in FIG. 6A and FIG. 6B, an embodiment of the present application provides still yet another method for sending an end marker. The method is applied to a scenario in which a source AN and a target AN can directly communicate with each other. Details are described below.

601. A source AN sends a switching request message to a target AN, where the switching request message carries information about a source DRB and information about a source NG3 path.

For the information about the source DRB and the information about the source NG3 path, refer to related descriptions in the embodiment shown in FIG. 2. Details are not described again.

602. The target AN receives the switching request message, establishes a target DRB and a target NG3 path based on the received switching request message, and allocates a resource to a forwarding path.

For establishment of the target DRB and the target NG3 path, refer to descriptions in steps 300*b* and 300*c*. Details are not described again.

It should be noted that, the forwarding path may be based on the source NG3 path, that is, one source NG3 path corresponds to one forwarding path, or the forwarding path may be based on the source DRB or the target DRB, for example, one source NG3 path corresponds to N forwarding path(s), and one forwarding path corresponds to one source DRB or target DRB. In an embodiment, this may be preconfigured by a core-network control-plane device for the source AN and/or the target AN. This is not limited herein. There are the following two cases based on the number of the forwarding path.

Case 1: The number of the forwarding path is 1, that is, the forwarding path is based on the source NG3 path. For the allocating a resource to a forwarding path in step 602, refer to step 300*d*. Details are not described again.

Case 2: The number of the forwarding path is N, where N is the number of the source DRB, that is, the forwarding path is based on the source DRB or the target DRB. The allocating a resource to a forwarding path in step 602 may include allocating a resource to the forwarding path based on the information about the source DRB, for example, correspondingly allocating resources to two forwarding paths if the information about the source DRB includes IDs of two source DRBs, or allocating a resource to the forwarding path based on the target DRB, for example, correspondingly allocating resources to three forwarding paths if the number of the target DRB is 3.

603. The target AN sends a switching acknowledgment message to the source AN.

The switching acknowledgment message may carry an IP address and a tunnel ID of the forwarding path on the target AN.

604. The source AN allocates a resource to the forwarding path.

In an embodiment, the source AN allocates an IP address and a tunnel ID of the forwarding path on the source AN.

Optionally, the method further includes storing, by the source AN, at least one of the following correspondences: a correspondence between the forwarding path and the source NG3 path; or a correspondence between the forwarding path, an ID of a UE, and the source NG3 path.

For the correspondences, refer to related descriptions in the embodiment shown in FIG. 2.

605. The source AN sends a switching command to the UE.

The switching command is used to instruct the UE to perform handover.

606. If the UE successfully accesses the target AN, the target AN sends a path switching request message to a core-network control-plane device.

For example, if the target AN receives an RRC reconfiguration complete (RRC reconfiguration complete) message sent by the UE, it is determined that the UE has successfully accessed the target AN.

The path switching request message is used to request to switch an NG3 path. The path switching request message may carry an ID of the source NG3 path and information about the target NG3 path.

In an embodiment, the information about the target NG3 path may include an IP address and a tunnel ID of the target NG3 path on the target AN. The ID of the source NG3 path may be a tunnel ID of the source NG3 path on the source AN, or may be a tunnel ID of the source NG3 path on a core-network user-plane device.

607. The core-network control-plane device receives the path switching request message, and sends a tunnel modification request message to a core-network user-plane device.

The path switching request message carries the ID of the source NG3 path and the information about the target NG3 path.

The tunnel modification request message carries the ID of the source NG3 path and the information about the target NG3 path. For the ID of the source NG3 path and the information about the target NG3 path, refer to related descriptions in the embodiment shown in FIG. 2.

608. The core-network user-plane device switches an NG3 path based on the tunnel modification request message.

For step 608, refer to related descriptions in step 402. Details are not described again.

609. The core-network user-plane device sends a first end marker to the source AN through the source NG3 path.

The first end marker is used to indicate that sending downlink data of the UE on the source NG3 path is completed, and may carry an IP address and a tunnel ID of the source NG3 path.

Optionally, the first end marker may further carry a data category indicator or an ID of the UE. For example, when the source NG3 path is based on an AN, the first end marker may carry the ID of the UE.

In an embodiment, the first end marker may be generated by the core-network user-plane device, for example, based on the implementation in step 403; or the first end marker may be generated by the core-network control-plane device, for example, based on the implementation in step 502. Details are not described again.

It should be noted that, when the first end marker is generated by the core-network control-plane device, the method further includes sending, by the core-network control-plane device, the generated first end marker to the core-network user-plane device, for example, sending the first end marker to the core-network user-plane device using the tunnel modification request message in step 607.

610. The source AN receives the first end marker, and generates N second end marker(s) based on the first end marker.

In the case 1 in step 602, an $i^{th}$ second end marker in the N second end markers generated in step 610 carries a data category indicator of an $x^{th}$ source DRB in the source DRBs corresponding to the source NG3 path, where $1 \le i \le N$ and $1 \le x \le N$, and a $j^{th}$ second end marker in the N second end markers carries a data category indicator of a $y^{th}$ source DRB in the source DRBs corresponding to the source NG3 path, where $1 \le j \le N$, $1 \le y \le N$, i, j, x, and y are all integers, i is not equal to j, and x is not equal to y.

In the case 2 in step 602, step 610 may include generating the N second end marker(s) based on the first end marker and the correspondence stored by the source AN in step 604. For details, refer to the implementation of step 202 in the embodiment shown in FIG. 2. Details are not described again.

611. The source AN sends the N second end marker(s) to the target AN through the forwarding path.

In the case 1 in step 602, the source AN sends the N second end marker(s) to the target AN through the forwarding path that is in a one-to-one correspondence with the source NG3 path. The target AN may match data category indicators carried in the N second end marker(s) with data category indicators of N target DRB(s), to obtain second end marker(s) corresponding to the target DRB(s), in order to help sort downlink data on the target DRB(s).

In the case 2 in step 602, the source AN sends the N second end marker(s) to the target AN through the N forwarding paths. One forwarding path corresponds to one target DRB. Therefore, one target DRB corresponds to one second end marker. For example, assuming that the second end marker(s) are numbered from 1 to N, and a forwarding path numbered 1 corresponds to a target DRB numbered 1, when a second end marker numbered 1 is sent to the target AN through the forwarding path numbered 1, the second end marker numbered 1 corresponds to the target DRB numbered 1, and the second end marker numbered 1 is used to sort downlink data of the UE on the target DRB numbered 1.

612. The target AN receives a path switching request acknowledgment message sent by the core-network control-plane device.

613. The target AN instructs the source AN to release a resource of the UE.

The resource may include the source DRB.

The method for sending an end marker provided in the foregoing embodiment is applied to a scenario in which the source AN and the target AN directly communicate with each other. The source AN generates N target-DRB-based second end marker(s) based on the received first end marker, and sends the N second end marker(s) to the target AN, in order to help sort downlink data of the UE on the target DRB. This resolves a problem that a core network cannot accurately send a target-DRB-based end marker to a target AN when a DRB is unknown to the core network, thereby avoiding downlink data disorder resulting from a UE handover. In addition, an end marker may be generated by the core-network control-plane device or the core-network user-plane device in a plurality of manners, such that the source AN can more flexibly generate a DRB-based end marker.

Figure 7A:
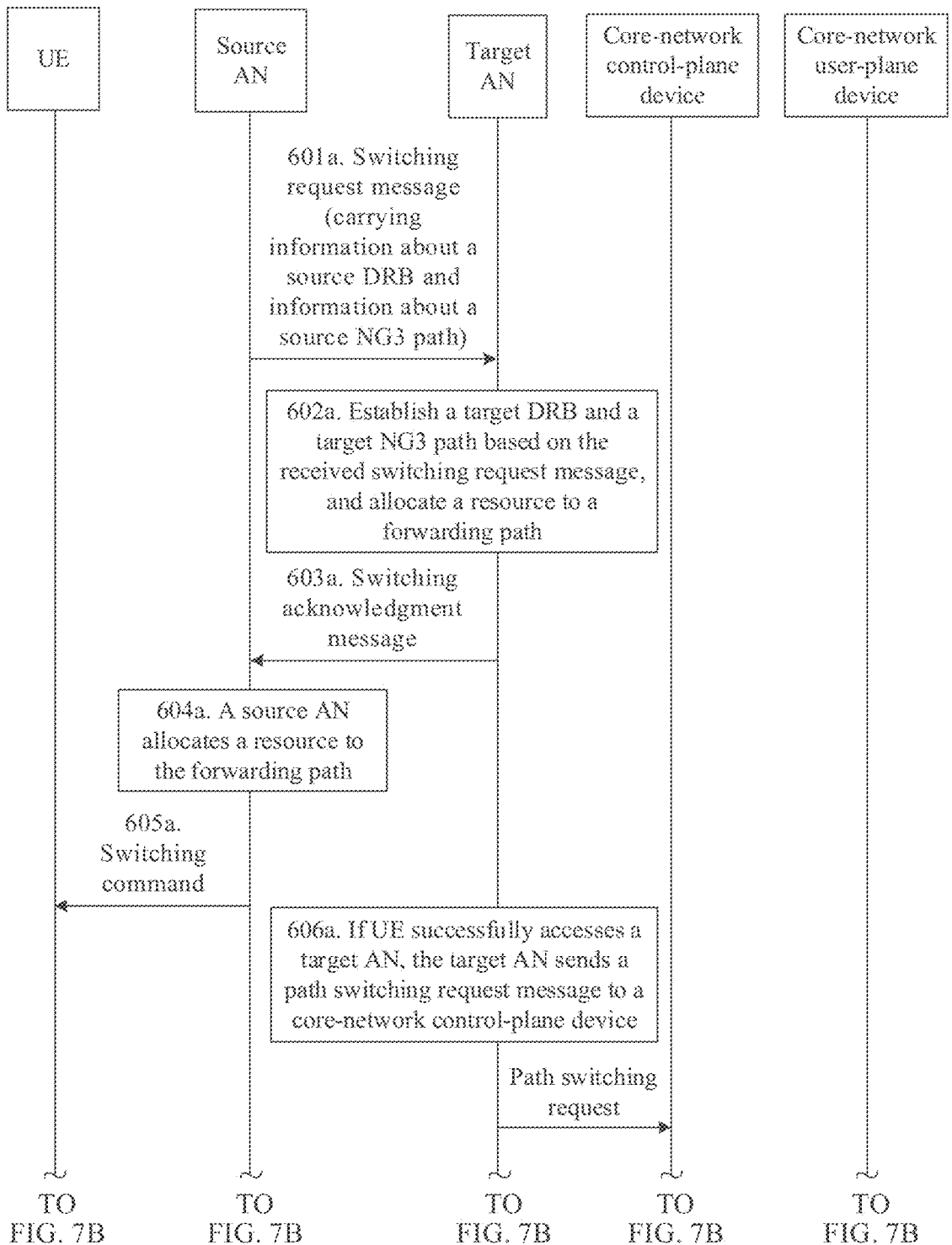
FIG. 7A and FIG. 7B are signaling interaction diagrams of another method for sending an end marker according to an embodiment of the present application.
Figure 7B:
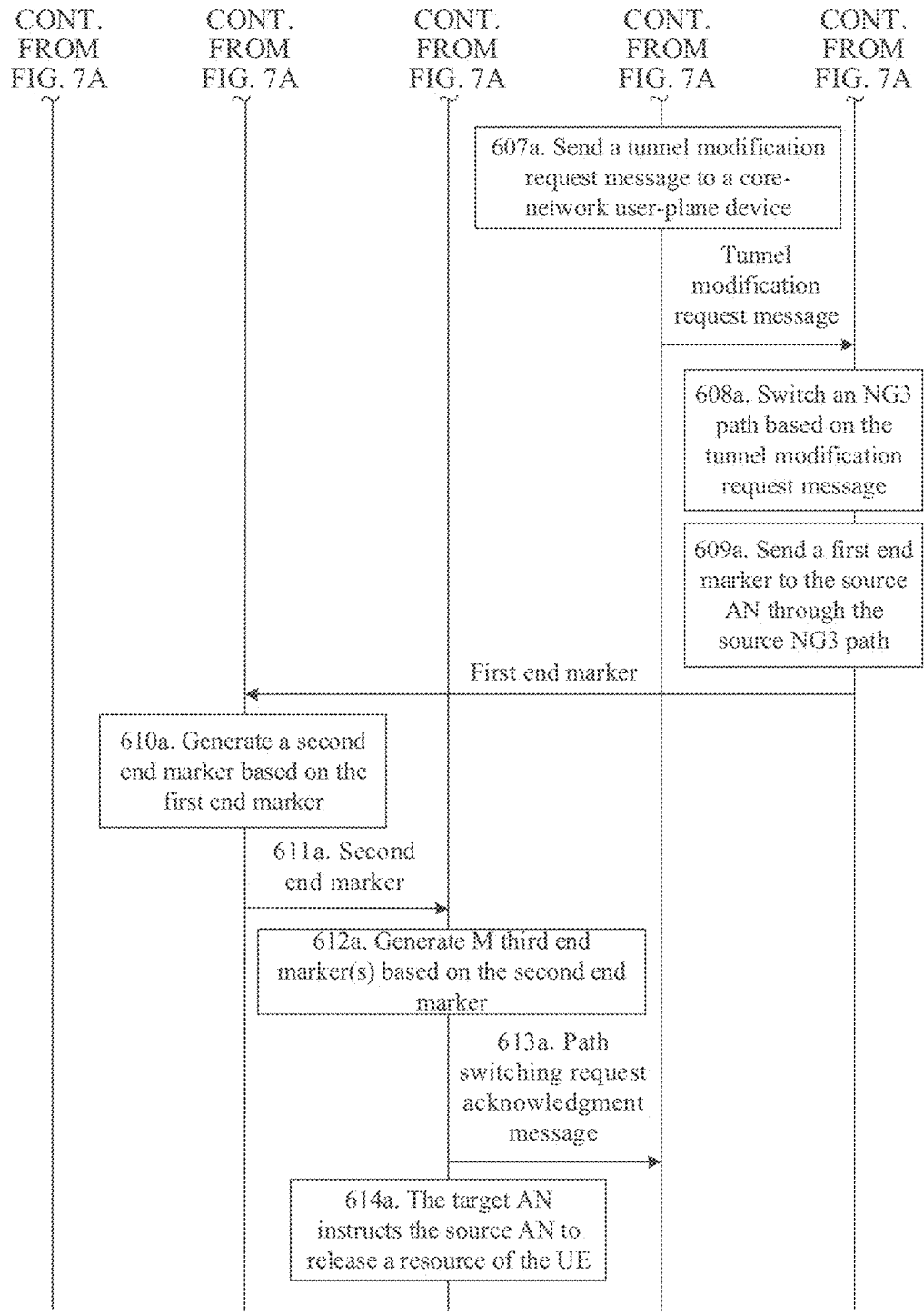

As shown in FIG. 7A and FIG. 7B, an embodiment of the present application provides another method for sending an end marker. The method is applied to a scenario in which a source AN and a target AN can directly communicate with each other. Details are described below.

601a. A source AN sends a switching request message to a target AN, where the switching request message carries information about a source DRB and information about a source NG3 path.

For the information about the source DRB and the information about the source NG3 path, refer to related descriptions in the embodiment shown in FIG. 2. Details are not described again.

602a. The target AN receives the switching request message, establishes a target DRB and a target NG3 path based on the received switching request message, and allocates a resource to a forwarding path.

For establishment of the target DRB and the target NG3 path, refer to descriptions in steps 300*b* and 300*c*. Details are not described again.

It should be noted that, the forwarding path is based on the source NG3 path, that is, one source NG3 path corresponds to one forwarding path. On a target AN side, the forwarding path corresponds to M target DRB(s).

For the allocating a resource to a forwarding path in step 602*a*, refer to step 300*d*. Details are not described again.

Optionally, step 602*a* further includes storing, by the target AN, at least one of the following correspondences: a correspondence between the forwarding path and the target DRB; or a correspondence between the forwarding path, an ID of a UE, and the target DRB.

For the correspondences and a data category indicator, refer to related descriptions in the embodiment shown in FIG. 3.

603a. The target AN sends a switching acknowledgment message to the source AN.

The switching acknowledgment message may carry an IP address and a tunnel ID of the forwarding path on the target AN.

604a. The source AN allocates a resource to the forwarding path.

In an embodiment, the source AN allocates an IP address and a tunnel ID of the forwarding path on the source AN.

605a. The source AN sends a switching command to the UE.

The switching command is used to instruct the UE to perform handover.

606a. If the UE successfully accesses the target AN, the target AN sends a path switching request message to a core-network control-plane device.

For example, if the target AN receives an RRC reconfiguration complete (RRC reconfiguration complete) message sent by the UE, it is determined that the UIE has successfully accessed the target AN.

The path switching request message is used to request to switch an NG3 path. The path switching request message may carry an ID of the source NG3 path and information about the target NG3 path.

In an embodiment, the information about the target NG3 path may include an IP address and a tunnel ID of the target NG3 path on the target AN. The ID of the source NG3 path may be a tunnel ID of the source NG3 path on the source AN, or may be a tunnel ID of the source NG3 path on a core-network user-plane device.

607a. The core-network control-plane device receives the path switching request message, and sends a tunnel modification request message to a core-network user-plane device.

The path switching request message carries the ID of the source NG3 path and the information about the target NG3 path.

The tunnel modification request message carries the ID of the source NG3 path and the information about the target NG3 path. For the ID of the source NG3 path and the information about the target NG3 path, refer to related descriptions in the embodiment shown in FIG. 2.

608a. The core-network user-plane device switches an NG3 path based on the tunnel modification request message.

For step 608*a*, refer to related descriptions in step 402. Details are not described again.

609a. The core-network user-plane device sends a first end marker to the source AN through the source NG3 path.

The first end marker is used to indicate that sending downlink data of the UE on the source NG3 path is completed, and may carry an IP address and a tunnel ID of the source NG3 path.

Optionally, the first end marker may further carry a data category indicator or an ID of the UE. For example, when the source NG3 path is based on an AN, the first end marker may carry the ID of the UE.

In an embodiment, the first end marker may be generated by the core-network user-plane device, for example, based on the implementation in step 403; or the first end marker may be generated by the core-network control-plane device, for example, based on the implementation in step 502. Details are not described again.

It should be noted that, when the first end marker is generated by the core-network control-plane device, the method further includes sending, by the core-network control-plane device, the generated first end marker to the core-network user-plane device, for example, sending the first end marker to the core-network user-plane device using the tunnel modification request message in step 607*a*.

610a. The source AN receives the first end marker, and generates a second end marker based on the first end marker.

In an embodiment, the second end marker may be generated by the source AN by modifying only path-related information in the first end marker, for example, replacing the IP address and the tunnel ID of the source NG3 path that are in the first end marker with the IP address and the tunnel ID of the forwarding path. Therefore, one second end marker is correspondingly generated based on one first end marker.

611a. The source AN sends the second end marker to the target AN through the forwarding path.

612a. The target AN receives the second end marker, and generates M third end marker(s) based on the second end marker.

It should be pointed out that M is the number of the target DRB corresponding to the forwarding path.

In an embodiment, the M third end marker(s) may be generated based on the second end marker and the correspondence stored by the source AN in step 602*a*. Refer to related descriptions in step 302.

613a. The target AN receives a path switching request acknowledgment message sent by the core-network control-plane device.

614a. The target AN instructs the source AN to release a resource of the UE.

The resource may include the source DRB.

The method for sending an end marker provided in the foregoing embodiment is applied to a scenario in which the source AN and the target AN directly communicate with each other. The target AN generates the target-DRB-based end marker based on the received first end marker, in order to help sort downlink data on the target DRB. This resolves a problem that a core network cannot accurately send a target-DRB-based end marker to a target AN when a DRB is unknown to the core network, thereby avoiding downlink data disorder resulting from a UE handover. In addition, an end marker may be generated by the core-network control-plane device or the core-network user-plane device in a plurality of manners, such that the target AN can more flexibly generate a DRB-based end marker.

Figure 8A:
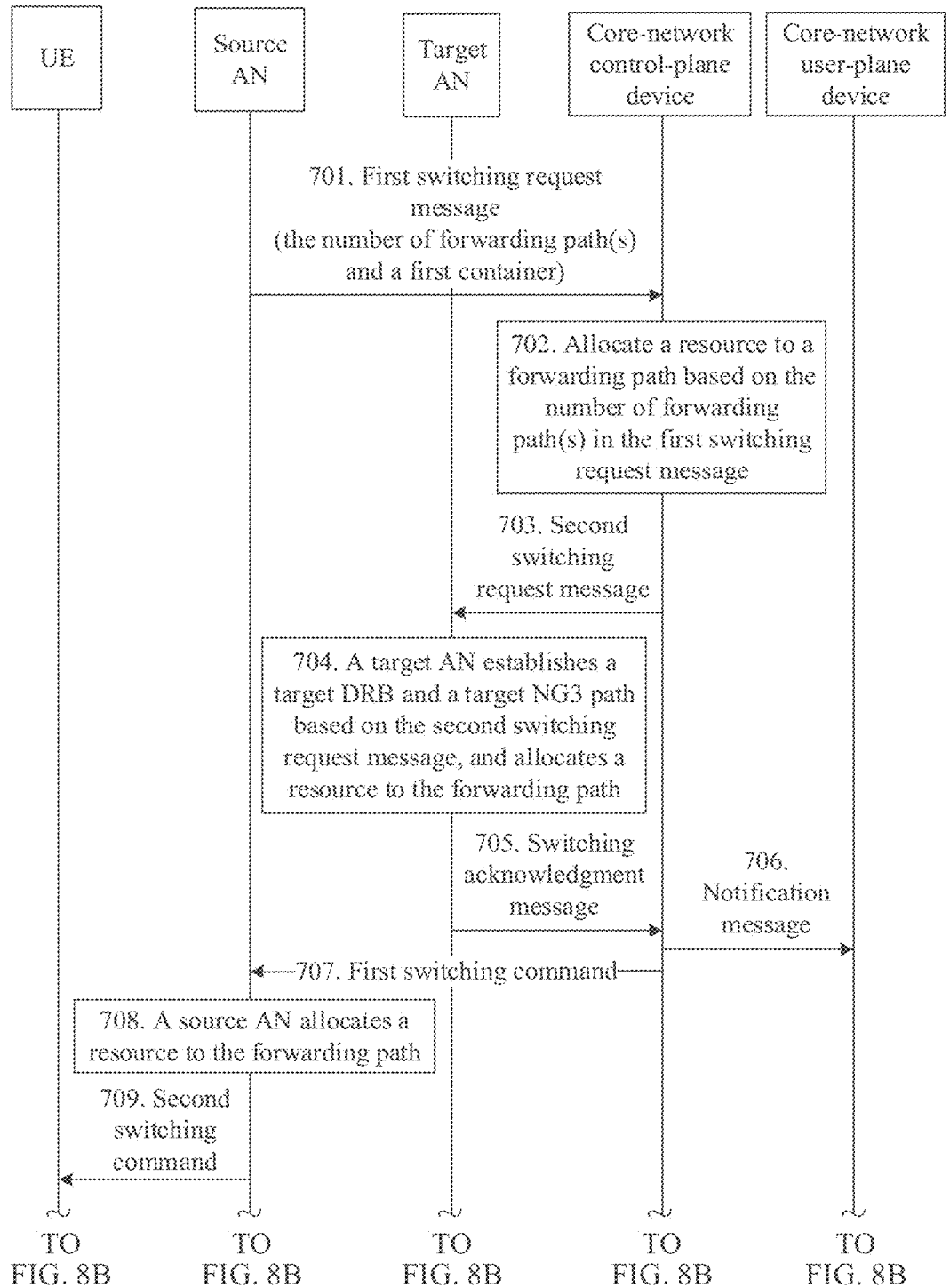
FIG. 8A and FIG. 8B are signaling interaction diagrams of still another method for sending an end marker according to an embodiment of the present application.
Figure 8B:
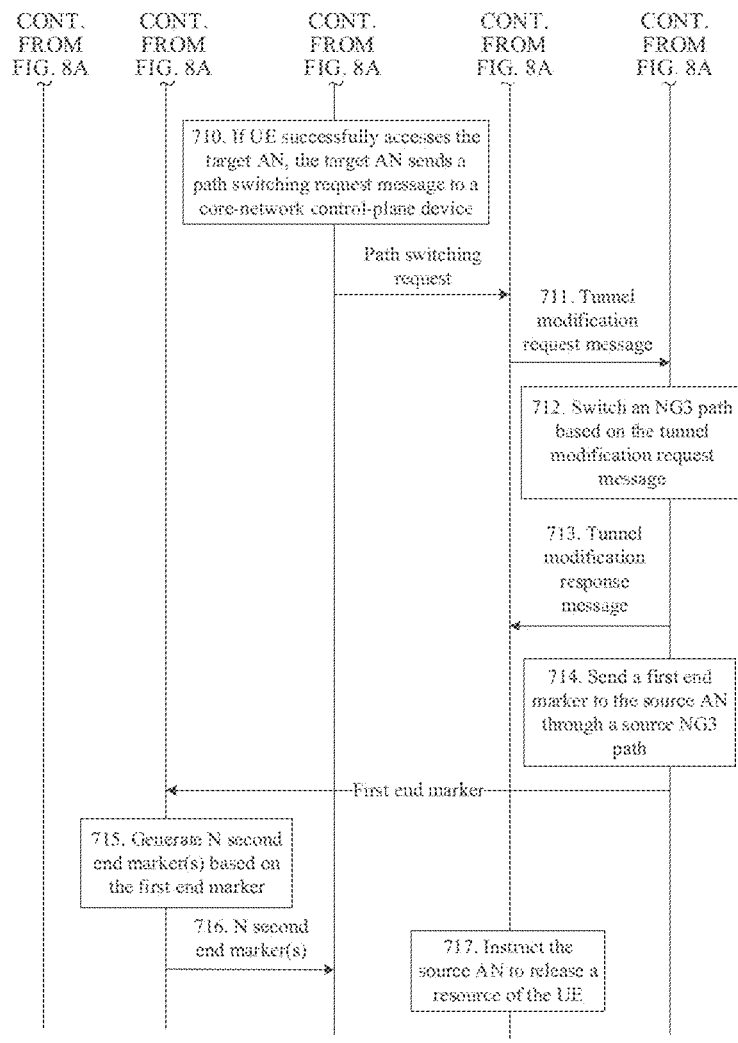

As shown in FIG. 8A and FIG. 8B, an embodiment of the present application provides still another method for sending an end marker. The method is applied to a scenario in which a source AN and a target AN can indirectly communicate with each other using a core-network user-plane device. Details are described below.

701. A source AN sends a first switching request message to a core-network control-plane device.

The first switching request message carries the number of forwarding path(s) and a first container.

For the first container, refer to related descriptions in step 300'a. Details are not described again.

702. The core-network control-plane device allocates a resource to a forwarding path based on the number of forwarding path(s) in the first switching request message.

For details, refer to related descriptions in step 500b.

703. The core-network control-plane device sends a second switching request message to a target AN, where the second switching request message carries a first container.

704. The target AN establishes a target DRB and a target NG3 path based on the second switching request message, and allocates a resource to the forwarding path.

In an embodiment, the target AN establishes the target DRB and the target NG3 path based on the first container. For example, the target AN establishes the target DRB based on information, in the first container, about a source DRB. The number of the target DRB is equal to the number of the source DRB. Refer to related descriptions in step 300b. The target AN establishes the target NG3 path based on information, in the first container, about a source NG3 path. Refer to related descriptions in step 300c.

It should be noted that the forwarding path may be based on the source NG3 path, or may be based on the source DRB or the target DRB. This may be preconfigured by the core-network control-plane device for the source AN and/or the target AN. Refer to related descriptions in step 602. Details are not described again.

Case 1: The number of forwarding path(s) is 1, that is, the forwarding path is based on the source NG3 path. For the allocating a resource to the forwarding path in step 704, refer to step 300d. Details are not described again.

Case 2: The number of forwarding path(s) is N, where N is the number of the source DRB, that is, the forwarding path is based on the source DRB or the target DRB. The allocating a resource to the forwarding path in step 704 may include allocating a resource to the forwarding path based on information about the source DRB, for example, correspondingly allocating a resource to one forwarding path based on an ID of one source DRB in the information about the source DRB. Alternatively, allocating a resource to the forwarding path in step 704 may include allocating a resource to the forwarding path based on the target DRB, for example, correspondingly allocating a resource to one forwarding path based on one target DRB.

705. The target AN sends a switching acknowledgment message to the core-network control-plane device.

The switching acknowledgment message carries an IP address and a tunnel ID of the forwarding path on the target AN.

706. The core-network control-plane device receives the switching acknowledgment message sent by the target AN, and sends a notification message to a core-network user-plane device.

The notification message carries the IP address and the tunnel ID of the forwarding path on the target AN.

707. The core-network control-plane device sends a first switching command to the source AN.

The first switching command carries an IP address and a tunnel ID of the forwarding path on the core-network user-plane device.

708. The source AN receives the first switching command, and allocates, on the source AN, a resource to the forwarding path.

Optionally, the method further includes storing, by the source AN, at least one of the following correspondences: a correspondence between the forwarding path and the source NG3 path, or a correspondence between the forwarding path, an ID of a UE, and the source NG3 path.

For the correspondences, refer to related descriptions in the embodiment shown in FIG. 2.

709. The source AN sends a second switching command to the UE.

The second switching command is used to instruct the UE to perform handover.

710. If the UE successfully accesses the target AN, the target AN sends a path switching request message to the core-network control-plane device.

For example, if the target AN receives an RRC reconfiguration complete message sent by the UE, it is determined that the UE has successfully accessed the target AN.

The path switching request message carries an NG2 connection identifier, an ID of the source NG3 path, and information about the target NG3 path. The ID of the source NG3 path may be an IP address and a tunnel ID of the source NG3 path. For the IP address and the tunnel ID of the source NG3 path, refer to related descriptions in step 201. Details are not described again.

711. The core-network control-plane device sends a tunnel modification request message to the core-network user-plane device.

The tunnel modification request message carries the information about the target NG3 path and the ID of the source NG3 path.

712. The core-network user-plane device switches an NG3 path based on the tunnel modification request message.

For step 712, refer to related descriptions in step 402. Details are not described again.

713. The core-network user-plane device sends a tunnel modification response message to the core-network control-plane device.

714. The core-network user-plane device sends a first end marker to the source AN through a source NG3 path.

The first end marker is used to indicate that sending downlink data of the UE on the source NG3 path is completed, and may carry an IP address and a tunnel ID of the source NG3 path.

Optionally, the first end marker may further carry a data category indicator or an ID of the UE. For example, when the source NG3 path is based on an AN, the first end marker may carry the ID of the UE.

In an embodiment, the first end marker may be generated by the core-network user-plane device, for example, based on the implementation in step 403; or the first end marker may be generated by the core-network control-plane device, for example, based on the implementation in step 502. Details are not described again.

It should be noted that, when the first end marker is generated by the core-network control-plane device, the method further includes sending, by the core-network control-plane device, the generated first end marker to the core-network user-plane device, for example, sending the first end marker to the core-network user-plane device using the tunnel modification request message in step 711.

715. The source AN generates N second end marker(s) based on the first end marker.

In the case 1 in step 704, an $i^{th}$ second end marker in the N second end markers generated in step 715 carries a data category indicator of an $x^{th}$ source DRB in source DRBs of the UE, where $1 \leq i \leq N$ and $1 \leq x \leq N$, and a $j^{th}$ second end marker in the N second end markers carries a data category indicator of a $y^{th}$ source DRB in the source DRBs of the UE, where $1 \leq j \leq N$, $1 \leq y \leq N$, i, j, x, and y are all integers, i is not equal to j, and x is not equal to y.

In the case 2 in step 704, step 715 may comprise generating the N second end marker(s) based on the first end marker and the correspondence stored by the source AN in step 708. For details, refer to the implementation of step 202 in the embodiment shown in FIG. 2. Details are not described again.

716. The source AN sends the N second end marker(s) to the target AN through the forwarding path.

In the case 1 in step 704, the source AN sends the N second end marker(s) to the target AN through the forwarding path that is in a one-to-one correspondence with the source NG3 path. The target AN may match data category indicators carried in the N second end marker(s) with data category indicators of N target DRBs, to obtain second end marker(s) corresponding to the target DRBs, in order to help sort downlink data on the target DRBs.

In the case 2 in step 704, the source AN sends the N second end marker(s) to the target AN through the N forwarding path(s). A forwarding path is based on a source DRB or a target DRB, and one forwarding path corresponds to one target DRB. Therefore, one target DRB corresponds to one second end marker. For example, assuming that the second end marker(s) are numbered from 1 to N, and a forwarding path numbered 1 corresponds to a target DRB numbered 1, when a second end marker numbered 1 is sent to the target AN through the forwarding path numbered 1, the second end marker numbered 1 corresponds to the target DRB numbered 1, and the second end marker numbered 1 is used to sort downlink data of the UE on the target DRB numbered 1.

717. The core-network control-plane device instructs the source AN to release a resource of the UE.

The resource may include the source DRB.

The method for sending an end marker provided in the foregoing embodiment is applied to a scenario in which the source AN and the target AN indirectly communicate with each other. The source AN generates N target-DRB-based second end marker(s) based on the received first end marker, and sends the N second end marker(s) to the target AN, in order to help sort downlink data on the target DRB. This resolves a problem that a core network cannot accurately send a target-DRB-based end marker to a target AN when a DRB is unknown to the core network, thereby avoiding downlink data disorder resulting from a UE handover. In addition, an end marker may be generated by the core-network control-plane device or the core-network user-plane device in a plurality of manners, such that the source AN or the target AN can more flexibly generate a DRB-based end marker.

Figure 9A:
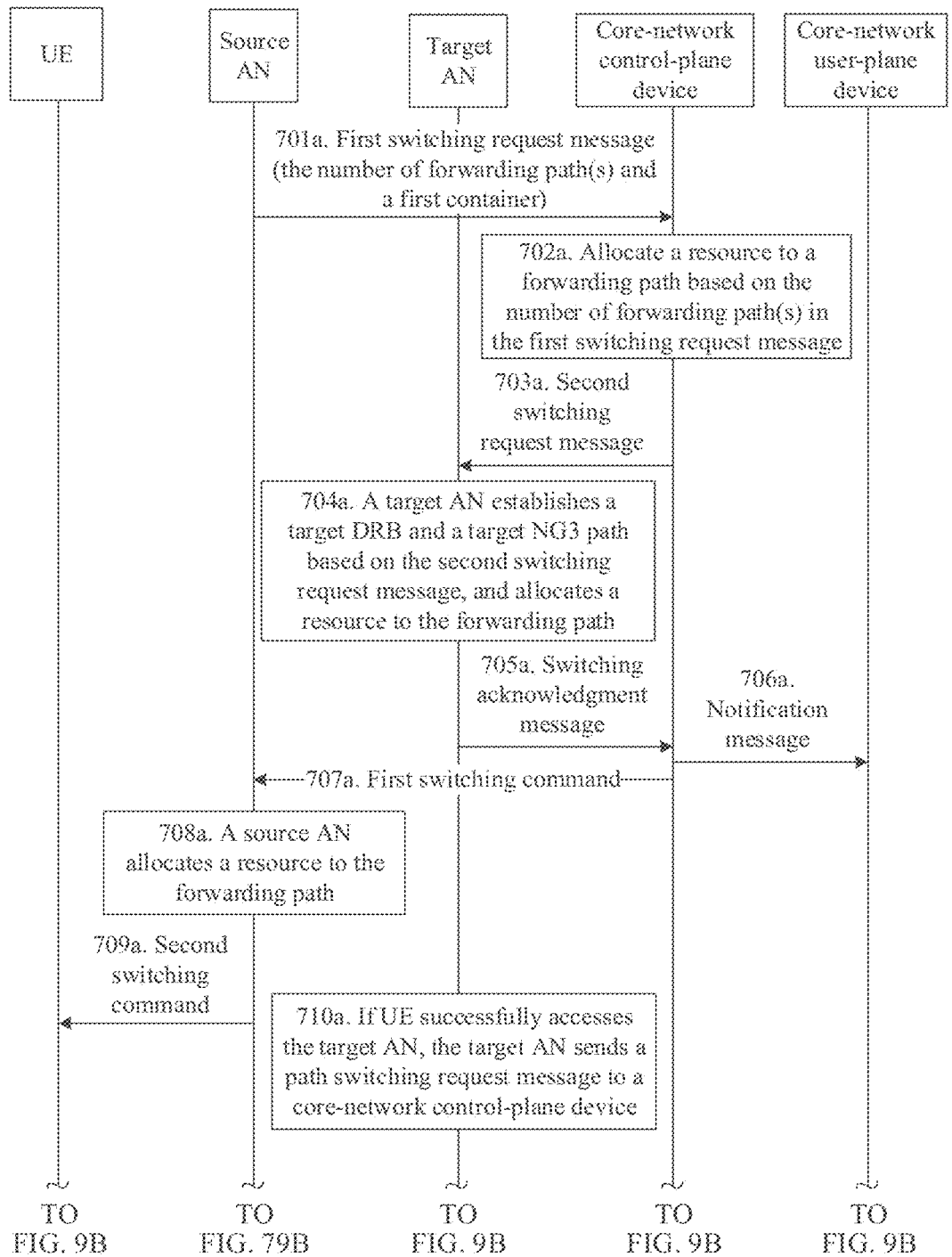
FIG. 9A and FIG. 9B are signaling interaction diagrams of yet another method for sending an end marker according to an embodiment of the present application.
Figure 9B:
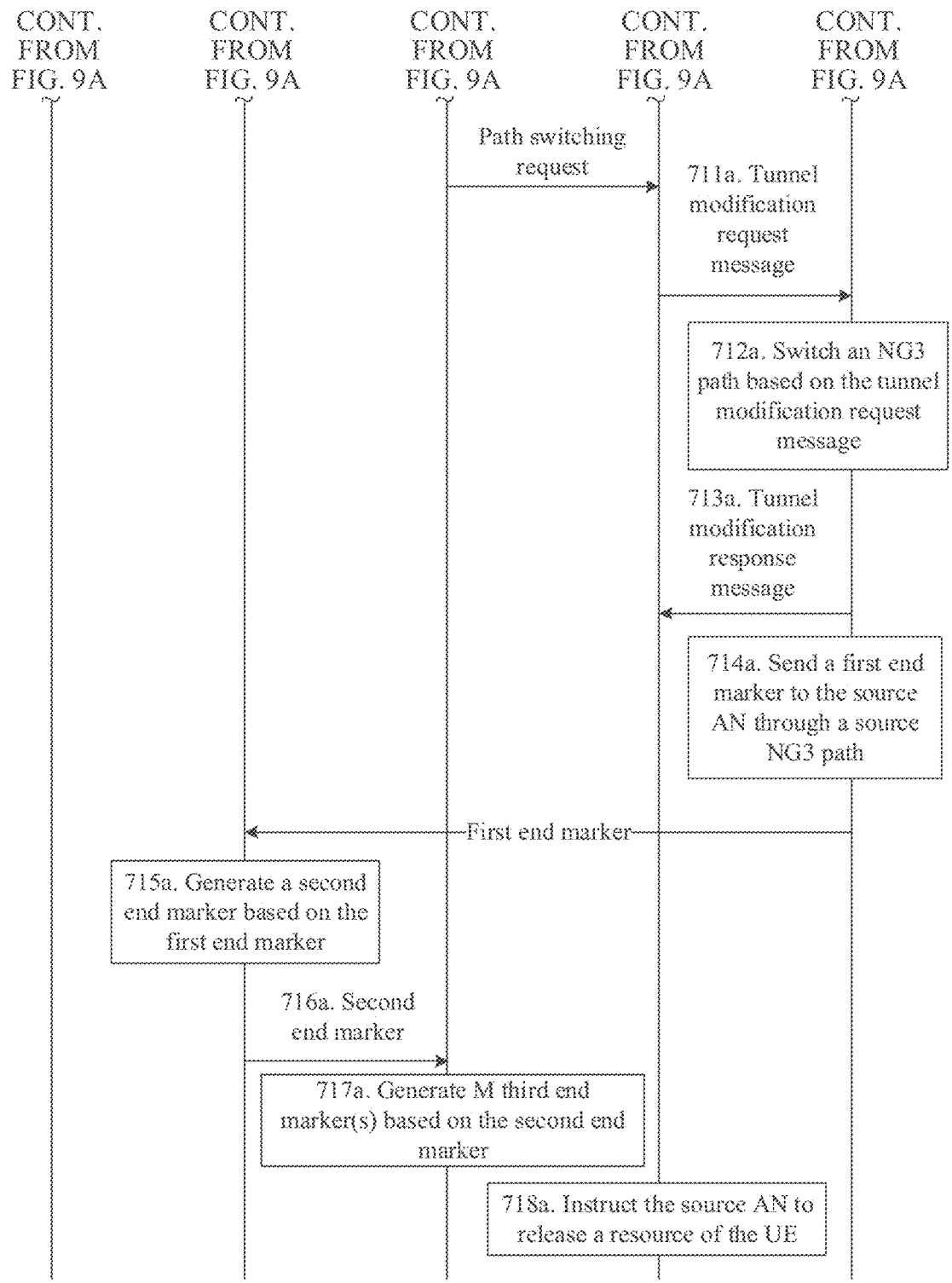

As shown in FIG. 9A and FIG. 9B, an embodiment of the present application provides yet another method for sending an end marker. The method is applied to a scenario in which a source AN and a target AN can indirectly communicate with each other using a core-network user-plane device. Details are described below.

701a. A source AN sends a first switching request message to a core-network control-plane device.

The first switching request message carries the number of forwarding path(s) and a first container.

For the first container, refer to related descriptions in step 300'a. Details are not described again.

702a. The core-network control-plane device allocates a resource to a forwarding path based on the number of forwarding path(s) in the first switching request message.

The number of forwarding path(s) is 1, that is, one forwarding path corresponds to one source NG3 path.

For details, refer to related descriptions in step 500b.

703a. The core-network control-plane device sends a second switching request message to a target AN, where the second switching request message carries a first container.

704a. The target AN establishes a target DRB and a target NG3 path based on the second switching request message, and allocates a resource to the forwarding path.

In an embodiment, the target AN establishes the target DRB and the target NG3 path based on the first container. For example, the target AN establishes the target DRB based on information, in the first container, about a source DRB. The number of the target DRB is equal to the number of the source DRB. Refer to related descriptions in step 300b. The target AN establishes the target NG3 path based on information, in the first container, about a source NG3 path. Refer to related descriptions in step 300c.

For the allocating a resource to the forwarding path in step 704a, refer to step 300d. Details are not described again.

Optionally, step 704a further includes storing, by the target AN, at least one of the following correspondences: a correspondence between the forwarding path and the target DRB; or a correspondence between the forwarding path, an ID of a UE, and the target DRB.

For the correspondences and a data category indicator, refer to related descriptions in the embodiment shown in FIG. 3.

705a. The target AN sends a switching acknowledgment message to the core-network control-plane device.

The switching acknowledgment message carries an IP address and a tunnel ID of the forwarding path on the target AN.

706a. The core-network control-plane device receives the switching acknowledgment message sent by the target AN, and sends a notification message to a core-network user-plane device.

The notification message carries the IP address and the tunnel ID of the forwarding path on the target AN.

707a. The core-network control-plane device sends a first switching command to the source AN.

The first switching command carries an IP address and a tunnel ID of the forwarding path on the core-network user-plane device.

708a. The source AN receives the first switching command, and allocates, on the source AN, a resource to the forwarding path.

709a. The source AN sends a second switching command to the UE.

The second switching command is used to instruct the UE to perform handover.

710a. If the UE successfully accesses the target AN, the target AN sends a path switching request message to the core-network control-plane device.

For example, if the target AN receives an RRC reconfiguration complete message sent by the UE, it is determined that the UE has successfully accessed the target AN.

The path switching request message carries an NG2 connection identifier, an ID of the source NG3 path, and information about the target NG3 path. The ID of the source NG3 path may be an IP address and a tunnel ID of the source NG3 path. For the IP address and the tunnel ID of the source NG3 path, refer to related descriptions in step 201. Details are not described again.

711a. The core-network control-plane device sends a tunnel modification request message to the core-network user-plane device.

The tunnel modification request message carries the information about the target NG3 path and the ID of the source NG3 path.

712a. The core-network user-plane device switches an NG3 path based on the tunnel modification request message.

For step 712a, refer to related descriptions in step 402. Details are not described again.

713a. The core-network user-plane device sends a tunnel modification response message to the core-network control-plane device.

714a. The core-network user-plane device sends a first end marker to the source AN through a source NG3 path.

The first end marker is used to indicate that sending downlink data of the UE on the source NG3 path is completed, and may carry an IP address and a tunnel ID of the source NG3 path.

Optionally, the first end marker may further carry a data category indicator or an ID of the UE. For example, when the source NG3 path is based on an AN, the first end marker may carry the ID of the UE.

In an embodiment, the first end marker may be generated by the core-network user-plane device, for example, based on the implementation in step 403; or the first end marker may be generated by the core-network control-plane device, for example, based on the implementation in step 502. Details are not described again.

It should be noted that, when the first end marker is generated by the core-network control-plane device, the method further includes sending, by the core-network control-plane device, the generated first end marker to the core-network user-plane device, for example, sending the first end marker to the core-network user-plane device using the tunnel modification request message in step 711a.

715a. The source AN generates a second end marker based on the first end marker.

In an embodiment, the second end marker may be generated by the source AN by modifying only path-related information in the first end marker, for example, replacing the IP address and the tunnel ID of the source NG3 path that are in the first end marker with the IP address and the tunnel ID of the forwarding path. One second end marker is correspondingly generated based on one first end marker.

716a. The source AN sends the second end marker to the target AN through the forwarding path.

In an embodiment, the source AN sends the second end marker to the target AN through the forwarding path that is in a one-to-one correspondence with the source NG3 path.

717a. The target AN receives the second end marker, and generates M third end marker(s) based on the second end marker.

It should be pointed out that M is the number of target DRB(s) corresponding to the forwarding path.

In an embodiment, in step 717a, the M third end marker(s) may be generated based on the second end marker and the correspondence stored by the target AN in step 704a. For details, refer to related descriptions in step 302.

718a. The core-network control-plane device instructs the source AN to release a resource of the UE.

The resource may include the source DRB.

The method for sending an end marker provided in the foregoing embodiment is applied to a scenario in which the source AN and the target AN indirectly communicate with each other. The target AN generates the target-DRB-based end marker based on the received first end marker, in order to help sort downlink data on the target DRB. This resolves a problem that a core network cannot accurately send a target-DRB-based end marker to a target AN when a DRB is unknown to the core network, thereby avoiding downlink data disorder resulting from a UE handover. In addition, an end marker may be generated by the core-network control-plane device or the core-network user-plane device in a plurality of manners, such that the source AN or the target AN can more flexibly generate a DRB-based end marker.

Figure 10:
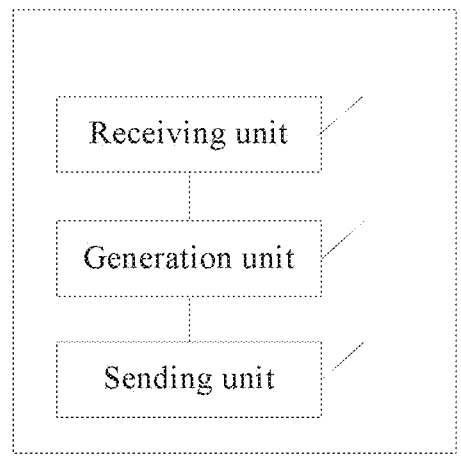
FIG. 10 is a structural diagram of a source AN according to an embodiment of the present application.

As shown in FIG. 10, an embodiment of the present application provides a source AN. The source AN may be configured to perform the actions of the source AN in the embodiment shown in FIG. 2, FIG. 6A and FIG. 6B, or FIG. 8A and FIG. 8B. The source AN may include a receiving unit 801, a generation unit 802, and a sending unit 803. Details are described below.

The receiving unit 801 is configured to receive, through a source NG3 path between the source AN and a core-network user-plane device, a first end marker sent by the core-network user-plane device, where the first end marker is used to indicate that sending downlink data of a UE on the source NG3 path is completed.

The generation unit 802 is configured to generate N second end marker(s) based on the first end marker received by the receiving unit 801, where N is the number of source DRB(s) corresponding to the source NG3 path.

The sending unit 803 is configured to send, to a target AN through a forwarding path corresponding to the source NG3 path, the N second end marker(s) generated by the generation unit 802, where the forwarding path is used by the source AN to forward, to the target AN, data of the UE received through the source NG3 path.

Optionally, in an implementation scenario, the sending unit 803 is further configured to such that before receiving, through the source NG3 path between the source AN and the core-network user-plane device, the first end marker sent by the core-network user-plane device, the sending unit 803 sends a first switching request message to the target AN, where the first switching request message carries information about the source DRB(s) of the UE and information about the source NG3 path.

The information about the source DRB(s) of the UE includes: QoS information of the source DRB(s), an ID of the source DRB(s), and a data category indicator of the source DRB(s).

The information about the source NG3 path includes: an IP address and a tunnel ID of the source NG3 path on the source AN, and an IP address and a tunnel ID of the source NG3 path on the core-network user-plane device.

Further, the receiving unit 801 may be further configured to receive a first switching acknowledgment message from the target AN, where the first switching acknowledgment message carries an IP address and a tunnel ID of the forwarding path on the target AN.

Optionally, in another implementation scenario, the sending unit 803 is further configured such that before receiving, through the source NG3 path between the source AN and the core-network user-plane device, the first end marker sent by the core-network user-plane device, the sending unit 803 sends a second switching request message to a core-network control-plane device, where the second switching request message carries the number of the forwarding path and a first container, and the first container includes information about the source DRB(s) of the UE and information about the source NG3 path.

The information about the source DRB(s) of the UE includes: QoS information of the source DRB(s), an ID of the source DRB(s), and a data category indicator of the source DRB(s). The information about the source NG3 path includes: an IP address and a tunnel ID of the source NG3 path on the source AN, and an IP address and a tunnel ID of the source NG3 path on the core-network user-plane device.

Further, the receiving unit 801 may be further configured to receive a switching command sent by the core-network control-plane device, where the switching command carries an IP address and a tunnel ID of the forwarding path on the core-network user-plane device.

Optionally, the number of the forwarding path is 1, and an $i^{th}$ second end marker in the N second end marker(s) carries a data category indicator of an $x^{th}$ source DRB in the source DRBs corresponding to the source NG3 path, where $1 \leq i \leq N$ and $1 \leq x \leq N$, and a $j^{th}$ second end marker in the N second end marker(s) carries a data category indicator of a $y^{th}$ source DRB in the source DRBs corresponding to the source NG3 path, where $1 \leq j \leq N$, $1 \leq y \leq N$, i, j, x, and y are all integers, i is not equal to j, and x is not equal to y.

Optionally, the number of the forwarding path is N, and the generation unit 802 may be configured to: generate the N second end marker(s) based on the first end marker and a correspondence between the forwarding path and the source NG3 path, or generate the N second end marker(s) based on the first end marker and a correspondence between the forwarding path, an ID of the UE, and the source NG3 path, where the first end marker carries the ID of the UE, or generate the N second end marker(s) based on the first end marker and a correspondence between an ID of the forwarding path, a data category indicator, and an ID of the source NG3 path, where the first end marker carries the data category indicator.

The generating the N second end marker(s) based on the first end marker and a correspondence between an ID of the forwarding path, a data category indicator, and an ID of the source NG3 path may include: checking, based on the data category indicator carried in the first end marker and the ID of the source NG3 path, the correspondence between the ID of the forwarding path, the data category indicator, and the ID of the source NG3 path, to obtain an ID of the forwarding path corresponding to the data category indicator and the ID of the source NG3 path; and generating the N second end marker(s) based on the obtained ID of the forwarding path.

It should be pointed out that, for details about the foregoing actions and meanings of the foregoing nouns, such as the first end marker, the second end marker(s), and the data category indicator, reference may be made to related descriptions in the embodiment shown in FIG. 2, FIG. 6A and FIG. 6B, or FIG. 8A and FIG. 8B. Details are not described again.

The source AN provided in the foregoing embodiment generates the DRB-based second end marker(s) based on the first end marker that is sent by the core-network user-plane device and received through the source NG3 path, and sends the second end marker(s) to the target AN through the forwarding path corresponding to a DRB, in order to help sort downlink data on the target DRB. This resolves a problem that a core network cannot accurately send a DRB-based end marker to a target AN when a DRB is unknown to the core network, thereby avoiding downlink data disorder resulting from a UE handover.

Figure 11:
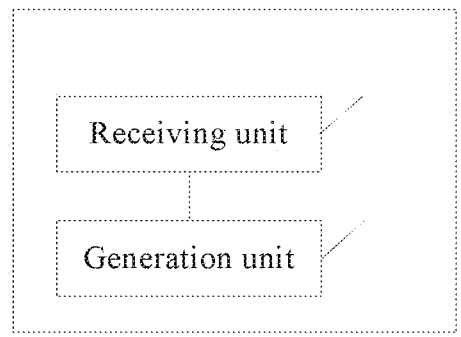
FIG. 11 is a structural diagram of a target AN according to an embodiment of the present application.

As shown in FIG. 11, an embodiment of the present application provides a target AN. The target AN may be configured to perform the actions of the target AN in the embodiment shown in FIG. 3, FIG. 7A and FIG. 7B, or FIG. 9A and FIG. 9B. The target AN may include a receiving unit 901 and a generation unit 902, as described below.

The receiving unit 901 is configured to receive a second end marker sent by a source AN, where a forwarding path is used by the source AN to forward, to the target AN, data of a UE received through a source NG3 path. The forwarding path is in a one-to-one correspondence with the source NG3 path.

The generation unit 902 is configured to generate M third end marker(s) based on the second end marker received by the receiving unit 901, where M is the number of target DRB(s) corresponding to the forwarding path, and the third end marker is used to sort downlink data of the UE on a target DRB corresponding to the third end marker.

Optionally, the generation unit 902 may be configured to generate the M third end marker(s) based on the second end marker and a correspondence between the forwarding path and the target DRB, or generate the M third end marker(s) based on the second end marker and a correspondence between the forwarding path, an ID of the UE, and the target DRB, where the second end marker carries the ID of the UE.

Optionally, in an implementation scenario, the target AN further includes a first processing unit 903, where the receiving unit 901 is further configured such that before receiving, through the forwarding path, the second end marker sent by the source AN, the receiving unit 901 receives a first switching request message sent by the source AN, where the first switching request message carries information about a source DRB of the UE and information about the source NG3 path. The first processing unit 903 is configured to establish the target DRB based on the information about the source DRB, establish a target NG3 path based on the information about the source NG3 path, and allocate a resource to the forwarding path. In an embodiment, the information about the source DRB of the UE includes: QoS information of the source DRB, an ID of the source DRB, and a data category indicator of the source DRB. The information about the source NG3 path includes: an IP address and a tunnel ID of the source NG3 path on the source AN, and an IP address and a tunnel ID of the source NG3 path on the core-network user-plane device.

Optionally, the target AN further includes a first sending unit 904 configured to send a first switching acknowledgment message to the source AN, where the first switching acknowledgment message carries an IP address and a tunnel ID of the forwarding path on the target AN.

Optionally, the target AN further includes a second sending unit 905 configured to send a first path switching request message to a core-network control-plane device, where the first path switching request message is used to request to switch an NG3 path.

The first path switching request message carries an ID of the source NG3 path and information about the target NG3 path. The information about the target NG3 path includes an IP address and a tunnel ID of the target NG3 path on the target AN.

The first path switching request message may further carry a data category indicator list of the target NG3 path.

Optionally, in a second implementation scenario, the target AN further includes a second processing unit 906 and a third sending unit 907, where the receiving unit 901 is further configured such that before receiving, through the forwarding path, the second end marker sent by the source AN, the receiving unit 901 receives a third switching request message sent by a core-network control-plane device, where the third switching request message carries a first container, and the first container includes information about a source DRB of the UE and information about the source NG3 path. In an embodiment, the second processing unit 906 is configured to establish the target DRB based on the information about the source DRB, establish a target NG3 path based on the information about the source NG3 path, and allocate a resource to the forwarding path based on the third switching request message. Further, the third sending unit 907 is configured to send a second switching acknowledgment message to the core-network control-plane device where the second switching acknowledgment message carries information about the forwarding path of the target AN.

The information about the source DRB of the UE includes: QoS information of the source DRB, an ID of the source DRB, and a data category indicator of the source DRB. The information about the source NG3 path includes: an IP address and a tunnel ID of the source NG3 path on the source AN, and an IP address and a tunnel ID of the source NG3 path on the core-network user-plane device.

The third sending unit 907 may be further configured to send a second path switching request message to the core-network control-plane device, where the second path switching request message is used to request to switch an NG3 path.

The second path switching request message carries an ID of the source NG3 path, information about the target NG3 path, and an NG2 connection identifier. The information about the target NG3 path includes an IP address and a tunnel ID of the target NG3 path on the target AN. The NG2 connection identifier is used to indicate that handover of the UE is completed.

It should be pointed out that, for details about the foregoing actions and meanings of the foregoing nouns, such as the third end marker, the NG2 connection identifier, and the data category indicator, reference may be made to related descriptions in the embodiment shown in FIG. 3, FIG. 7A and FIG. 7B, or FIG. 9A and FIG. 9B. Details are not described again.

The target AN provided in the foregoing embodiment generates the target-DRB-based third end marker(s) based on the second end marker that is sent by the source AN and received through the forwarding path, in order to help sort downlink data of the UE on the target DRB. This resolves a problem that a core network cannot accurately send a DRB-based end marker to a target AN when a DRB is unknown to the core network, thereby avoiding downlink data disorder resulting from a UE handover.

Figure 12:
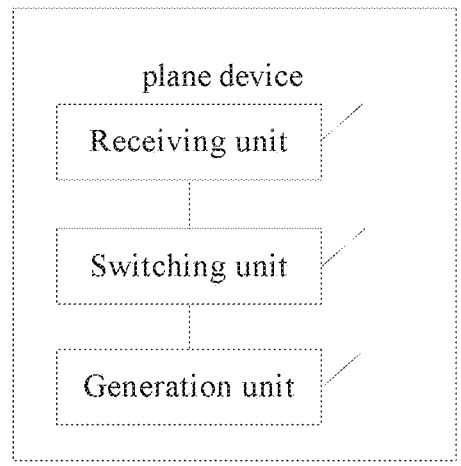
FIG. 12 is a structural diagram of a core-network control-plane device according to an embodiment of the present application.

As shown in FIG. 12, an embodiment of the present application provides a core-network user-plane device. The core-network user-plane device may be configured to perform the actions of the core-network user-plane device in any one of the embodiments shown in FIG. 4, or FIG. 6A and FIG. 6B to FIG. 9A and FIG. 9B. The device may include a receiving unit 1001 configured to receive a tunnel modification request message sent by a core-network control-plane device, where the tunnel modification request message carries an ID of a source NG3 path and information about a target NG3 path, the source NG3 path is a transmission path between a source AN and the core-network user-plane device, the target NG3 path is a transmission path between a target AN and the core-network user-plane device, and the information about the target NG3 path includes an IP address and a tunnel ID of the target NG3 path on the target AN. The device may further include a switching unit 1002 configured to switch an NG3 path based on the tunnel modification request message, and a generation unit 1003 configured to: generate a first end marker, and send the first end marker to the source AN through the source NG3 path, where the first end marker is used to indicate that sending downlink data of a UE on the source NG3 path is completed.

Optionally, the generation unit 1003 is configured to: generate the first end marker based on the ID of the source NG3 path, where the number of the first end marker is equal to the number of the source NG3 path; or generate the first end marker based on a data category indicator list of the target NG3 path, where the number of the first end marker is equal to the number of the data category indicator included in the data category indicator list; or generate the first end marker based on an ID of the UE and the ID of the source NG3 path, where the first end marker carries the ID of the UE, and the number of the first end marker is equal to the number of the source NG3 path.

The tunnel modification request message may further carry the data category indicator list of the target NG3 path or the ID of the UE.

It should be pointed out that, for details about the foregoing actions and meanings of the foregoing nouns, such as the first end marker and the data category indicator, reference may be made to related descriptions in the embodiments shown in FIG. 4, or FIG. 6A and FIG. 6B to FIG. 9A and FIG. 9B. Details are not described again.

The core-network user-plane device provided in the foregoing embodiment generates the first end marker in a plurality of manners, and sends the first end marker to the source AN, such that the source AN or the target AN can more flexibly generate a DRB-based end marker. This resolves a problem that a core network cannot accurately send a DRB-based end marker to a target AN when a DRB is unknown to the core network, thereby avoiding downlink data disorder resulting from a UE handover.

Figure 13:
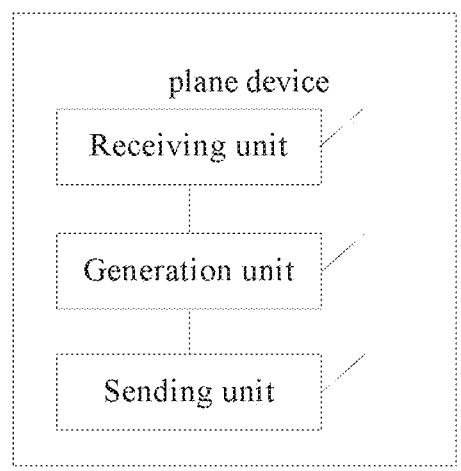
FIG. 13 is a structural diagram of a core-network user-plane device according to an embodiment of the present application.

As shown in FIG. 13, an embodiment of the present application provides a core-network control-plane device. The core-network control-plane device may be configured to perform the actions of the core-network control-plane device in any one of the embodiments shown in FIG. 5 to FIG. 9A and FIG. 9B. The device may include: a receiving unit 1101, a generation unit 1102, and a sending unit 1103. Details are described below.

The receiving unit 1101 is configured to receive a path switching request message sent by a target AN, where the path switching request message is used to request to switch an NG3 path, the path switching request message carries an ID of a source NG3 path and information about a target NG3 path, and the information about the target NG3 path includes an IP address and a tunnel ID of the target NG3 path on the target AN.

The generation unit 1102 is configured to generate a first end marker, where the first end marker is used to indicate that sending downlink data of a UE on the source NG3 path is completed.

The sending unit 1103 is configured to send a tunnel modification request message to a core-network user-plane device, where the tunnel modification request message carries the ID of the source NG3 path, the information about the target NG3 path, and the first end marker.

Optionally, the generation unit 1102 is configured to: generate the first end marker based on the ID of the source NG3 path, where the number of the first end marker is equal to the number of the source NG3 path, or generate the first end marker based on a data category indicator list of the target NG3 path, where the number of first end marker is equal to the number of the data category indicator included in the data category indicator list, or generate the first end marker based on an ID of the UE and the ID of the source NG3 path, where the first end marker carries the ID of the UE, and the number of the first end marker is equal to the number of the source NG3 path.

Optionally, the path switching request message further carries an NG2 connection identifier, and the NG2 connection identifier is used to indicate that handover of the UE is completed. Alternatively, the path switching request message further carries a data category indicator list of the target NG3 path, and the tunnel modification request message further carries the data category indicator list of the target NG3 path.

Optionally, the core-network control-plane device further includes a processing unit 1104, where the receiving unit 1101 is further configured such that before receiving the path switching request message sent by the target AN, the receiving unit 1101 receives a second switching request message sent by the source AN, where the second switching request message carries the number of forwarding path(s) and a first container, and the first container includes information about a source DRB of the UE and information about the source NG3 path. The processing unit 1104 is configured to allocate a resource to a forwarding path based on the number of forwarding path(s). The sending unit 1103 is further configured to send a third switching request message to the target AN, where the third switching request message carries the first container. The receiving unit 1101 is further configured to receive a second switching acknowledgment message sent by the target AN, where the second switching acknowledgment message carries an IP address and a tunnel ID of the forwarding path on the target AN.

Optionally, the sending unit 1103 is further configured to send a switching command to the source AN, where the switching command carries an IP address and a tunnel ID of the forwarding path on the core-network user-plane device.

Optionally, the sending unit 1103 is further configured to send a first notification message to the core-network user-plane device, where the first notification message is used to notify the core-network user-plane device that allocating the resource to the forwarding path is completed.

It should be pointed out that, for details about the foregoing actions and meanings of the foregoing nouns, such as the first end marker and the data category indicator, reference may be made to related descriptions in the embodiments shown in FIG. 5 to FIG. 9A and FIG. 9B. Details are not described again.

The core-network control-plane device provided in the foregoing embodiment generates the first end marker in a plurality of manners, and sends the first end marker to the source AN using the core-network user-plane device, such that the source AN or the target AN can more flexibly generate a DRB-based end marker. This resolves a problem that a core network cannot accurately send a DRB-based end marker to a target AN when a DRB is unknown to the core network, thereby avoiding downlink data disorder resulting from a UE handover.

Figure 14:
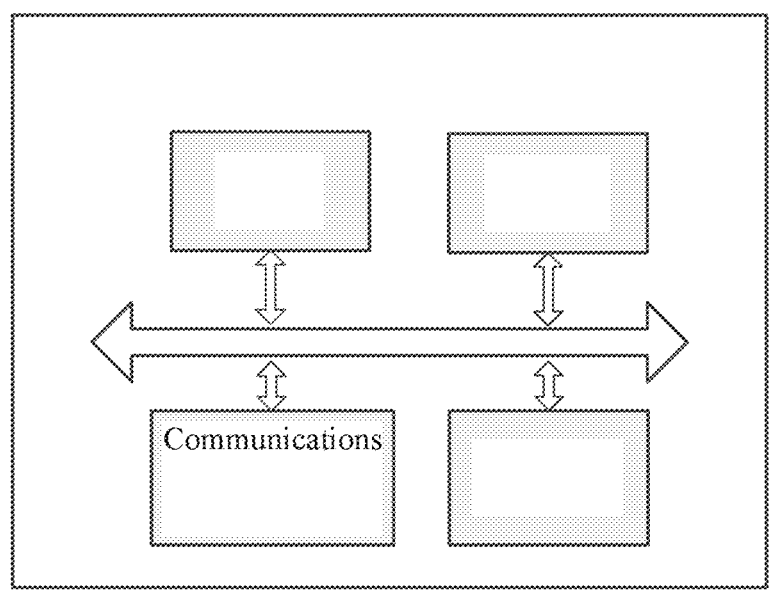
FIG. 14 is a diagram of a hardware structure of a source AN according to an embodiment of the present application.

As shown in FIG. 14, an embodiment of the present application provides a source AN. The source AN may include: a processor 1201, a memory 1202, a communications interface 1203, and a transceiver 1204, as described below.

The memory 1202 is configured to store a program.

The processor 1201 is configured to execute the program stored in the memory 1202, in order to implement the actions of the source AN in the embodiment shown in FIG. 2, FIG. 6A and FIG. 6B, or FIG. 8A and FIG. 8B. Details are not described again.

It should be noted that, in the embodiment shown in FIG. 2, FIG. 6A and FIG. 6B, or FIG. 8A and FIG. 8B, a message sent by the source AN to a target AN, a core-network control-plane device, or a core-network user-plane device may be sent through the communications interface 1203. Additionally, the source AN may also receive, through the communications interface 1203, a message sent by the target AN, the core-network control-plane device, or the core-network user-plane device to the source AN. In addition, a message sent by the source AN to the UE may be sent using the transceiver 1204, and the source AN may also receive, using the transceiver 1204, a message sent by the UE to the source AN.

Figure 15:
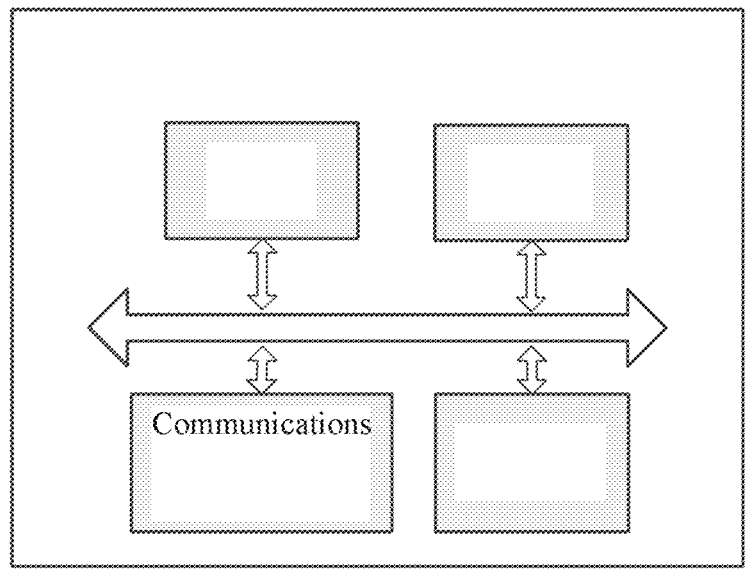
FIG. 15 is a diagram of a hardware structure of a target AN according to an embodiment of the present application.

As shown in FIG. 15, an embodiment of the present application provides a target AN. The target AN may include a processor 1301, a memory 1302, a communications interface 1303, and a transceiver 1304, as described below.

The memory 1302 is configured to store a program.

The processor 1301 is configured to execute the program stored in the memory 1302, in order to implement the actions of the target AN in the embodiment shown in FIG. 2, FIG. 7A and FIG. 7B, or FIG. 9A and FIG. 9B. Details are not described again.

It should be noted that, in the embodiment shown in FIG. 2, FIG. 7A and FIG. 7B, or FIG. 9A and FIG. 9B, a message sent by the target AN to a source AN, a core-network control-plane device, or a core-network user-plane device may be sent through the communications interface 1303. The target AN may also receive, through the communications interface 1303, a message sent by the source AN, the core-network control-plane device, or the core-network user-plane device to the target AN. In addition, a message sent by the target AN to the UE may be sent using the transceiver 1304, and the target AN may also receive, using the transceiver 1304, a message sent by the UE to the target AN.

Figure 16:
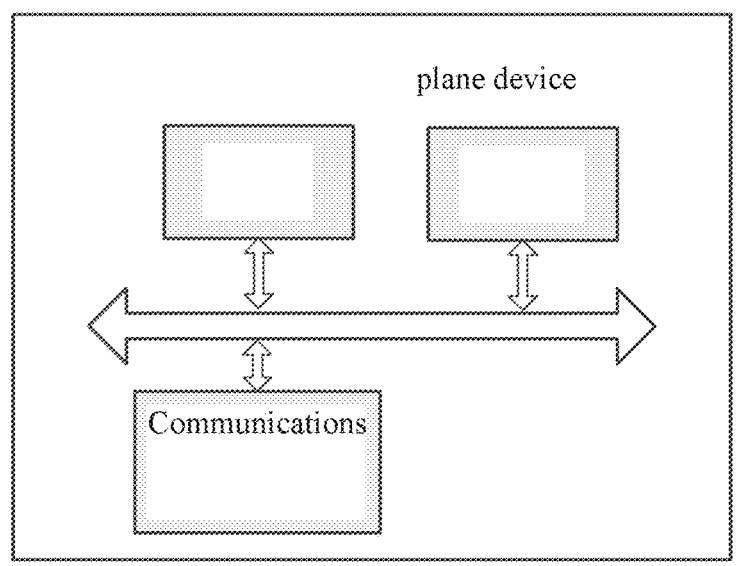
FIG. 16 is a diagram of a hardware structure of a core-network control-plane device according to an embodiment of the present application.

As shown in FIG. 16, an embodiment of the present application provides a core-network user-plane device. The core-network user-plane device may include: a processor 1401, a memory 1402, and a communications interface 1403, as described below.

The memory 1402 is configured to store a program.

The processor 1401 is configured to execute the program stored in the memory 1402, in order to implement the actions of the core-network user-plane device in any one of the embodiments shown in FIG. 4, or FIG. 6A and FIG. 6B to FIG. 9A and FIG. 9B. Details are not described again.

It should be noted that, a message sent by the core-network user-plane device to a source AN or a core-network control-plane device may be sent through the communications interface 1403. The core-network user-plane device may also receive, through the communications interface 1403, a message sent by the source AN or the core-network control-plane device to the core-network user-plane device.

Figure 17:
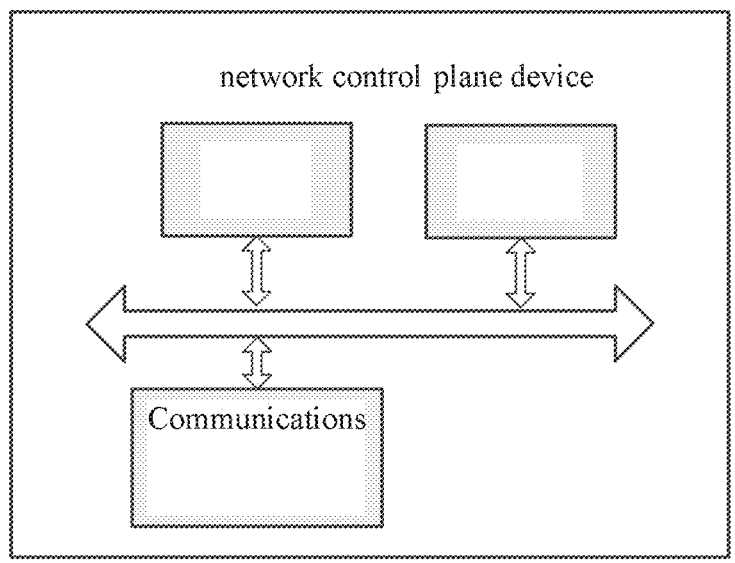
FIG. 17 is a diagram of a hardware structure of a core-network user-plane device according to an embodiment of the present application.

As shown in FIG. 17, an embodiment of the present application provides a core-network control-plane device, including: a processor 1501, a memory 1502, and a communications interface 1503, as described below.

The memory 1502 is configured to store a program.

The processor 1501 is configured to execute the program stored in the memory 1502, in order to implement the actions of the core-network control-plane device in any one of the embodiments shown in FIG. 5 to FIG. 9A and FIG. 9B. Details are not described again.

It should be noted that, a message sent by the core-network control-plane device to a source AN, a core-network user-plane device, or a target AN may be sent through the communications interface 1503. The core-network control-plane device may also receive, through the communications interface 1503, a message sent by the source AN, the core-network user-plane device, or the target AN to the core-network control-plane device.

The present application further provides a communications system. The system may include the source AN shown in FIG. 10, the core-network user-plane device shown in FIG. 12, and the core-network control-plane device shown in FIG. 13. In addition, the system may further include a target AN configured to receive N second end marker(s) sent by the source AN. The target AN may be further configured to sort downlink data of a UE on a target DRB using the N second end marker(s).

It should be noted that, for actions performed by each network element in the system, reference may be made to the embodiment shown in FIG. 6A and FIG. 6B or FIG. 8A and FIG. 8B.

The present application further provides another communications system. The system may be applied to a scenario in which forwarding paths are in a one-to-one correspondence with source NG3 paths, and may include the target AN shown in FIG. 11, the core-network user-plane device shown in FIG. 12, and the core-network control-plane device shown in FIG. 13. In addition, the system may further include a source AN configured to: receive a first end marker sent by the core-network user-plane device, generate a second end marker based on the first end marker, and send the second end marker to the target AN through a forwarding path corresponding to a source NG3 path.

It should be noted that, for actions performed by each network element in the system, reference may be made to the embodiment shown in FIG. 7A and FIG. 7B or FIG. 9A and FIG. 9B.

Persons of ordinary skill in the art may understand that all or some steps of the method embodiments may be implemenmed by a program instructing relevant hardware. The program may be stored in a computer readable storage medium. When the program runs, the steps of the method embodiments are performed. The storage medium includes any medium that can store program code, such as a ROM, a RAM, a magnetic disc, or an optical disc.

Finally, it should be noted that the foregoing embodiments are merely intended for describing the technical solutions of the present application, but not for limiting the present application. Although the present application is described in detail with reference to the foregoing embodiments, persons of ordinary skill in the art should understand that they may still make modifications to the technical solutions described in the foregoing embodiments or make equivalent replacements to some technical features thereof without departing from the scope of the technical solutions of the embodiments of the present application.

What is claimed is:

1. A method comprising:
   sending, by a core-network user-plane device through a source path between a source access node (AN) and the core-network user-plane device, a first end marker to the source AN, wherein the first end marker indicates that sending downlink data of a user equipment (UE) on the source path is completed;
   receiving, by the source AN, the first end marker;
   generating, by the source AN, N second end markers based on the first end marker, wherein N is greater than or equal to 2; and
   sending, by the source AN, the N second end markers to a target AN through N forwarding paths,
   wherein the N forwarding paths are for forwarding, to the target AN, data of the UE received through the source path.

2. The method according to claim 1, wherein before receiving the first end marker, the method further comprises sending, by the source AN, a first switching request message to the target AN, wherein the first switching request message carries first information about source data radio bearers (DRBs) of the UE and second information about the source path, and wherein the source DRBs correspond to the source path.

3. The method according to claim 2, wherein the first information comprises: quality of service (QoS) information of the source DRBs, an identifier (ID) of each of the source DRBs, and a data category indicator of each of the source DRBs.

4. The method according to claim 3, wherein the second information comprises: a first Internet Protocol (IP) address and a first tunnel ID of a first portion of the source path on the source AN, and a second IP address and a second tunnel ID of a second portion of the source path on the core-network user-plane device.

5. The method according to claim 1, wherein before receiving the first end marker, the method further comprises sending, by the source AN, a switching request message to a core-network control-plane device, wherein the switching request message carries a number of the N forwarding paths and a first container, wherein the first container comprises first information about source data radio bearers (DRBs) and second information, and wherein the first information comprises: quality of service (QoS) information of the source DRBs, an identifier (ID) of each of the source DRBs, and a data category indicator of each of the source DRBs.

6. The method according to claim 5, wherein the second information comprises a first Internet Protocol (IP) address and a tunnel ID of a first portion of the source path on the source AN, and a second IP address and a second tunnel ID of a second portion of the source path on the core-network user-plane device.

7. The method according to claim 5, further comprising receiving, by the source AN, a switching command from the core-network control-plane device, wherein the switching command carries an Internet Protocol (IP) address and a tunnel ID of a forwarding path on the core-network user-plane device.

8. The method according to claim 1, wherein generating the N second end markers based on the first end marker comprises generating, by the source AN, the N second end markers based on the first end marker and a correspondence between the N forwarding paths and the source path.

9. The method according to claim 1, further comprising receiving, by the target AN, the N second end markers through the N forwarding paths.

10. The method according to claim 1, wherein N is a number of source data radio bearers (DRBs) corresponding to the source path.

11. A communication system, comprising:
a core-network user-plane device; and
a source access node (AN) configured to:
receive, through a source path between the source AN and the core-network user-plane device, a first end marker from the core-network user-plane device, wherein the first end marker indicates that sending downlink data of a user equipment (UE) on the source path is completed;
generate N second end markers based on the first end marker, wherein N is greater than or equal to 2; and
send the N second end markers to a target AN through N forwarding paths,
wherein the N forwarding paths are for forwarding, to the target AN, data of the UE received through the source path.

12. The communication system according to claim 11, wherein the source AN is configured to generate the N second end markers based on the first end marker and a correspondence between the N forwarding paths and the source path.

13. The communication system according to claim 11, wherein the source AN is further configured to send a first switching request message to the target AN, wherein the first switching request message carries first information about source data radio bearers (DRBs) of the UE and second information about the source path, and wherein the source DRBs of the UE correspond to the source path.

14. The communication system according to claim 13, wherein the first information comprises: quality of service (QoS) information of the source DRBs, an identifier (ID) of each of the source DRBs, and a data category indicator of each of the source DRBs.

15. The communication system according to claim 14, wherein the second information comprises: a first Internet Protocol (IP) address and a first tunnel ID of a first portion of the source path on the source AN, and a second IP address and a second tunnel ID of a second portion of the source path on the core-network user-plane device.

16. The communication system according to claim 11, wherein the source AN is further configured to send a switching request message to a core-network control-plane device, wherein the switching request message carries a number of the N forwarding paths and a first container, wherein the first container comprises first information about source data radio bearers (DRBs) and second information about the source path, and wherein the first information comprises: quality of service (QoS) information of the source DRBs, an identifier (ID) of each of the source DRBs, and a data category indicator of each of the source DRBs.

17. The communication system according to claim 16, wherein the second information comprises: a first Internet Protocol (IP) address and a first tunnel ID of a first portion of the source path on the source AN, and a second IP address and a second tunnel ID of a second portion of the source path on the core-network user-plane device.

18. The communication system according to claim 16, wherein the source AN is further configured to receive a switching command from the core-network control-plane device, and wherein the switching command carries an Internet Protocol (IP) address and a tunnel ID of a forwarding path on the core-network user-plane device.

19. The communication system according to claim 16, further comprising the target AN, wherein the target AN is configured to receive the N second end markers.

20. The communication system according to claim 16, wherein N is a number of the source DRBs corresponding to the source path.

* * * * *

UNITED STATES PATENT AND TRADEMARK OFFICE
CERTIFICATE OF CORRECTION

| | | |
|---|---|---|
| PATENT NO. | : 11,818,645 B2 | Page 1 of 1 |
| APPLICATION NO. | : 17/234285 | |
| DATED | : November 14, 2023 | |
| INVENTOR(S) | : Qianghua Zhu and Chunshan Xiong | |

It is certified that error appears in the above-identified patent and that said Letters Patent is hereby corrected as shown below:

On the Title Page

Page 2, item (56) References Cited, U.S. Patent Documents: "2010/0111041 A1 5/2010 Im et al." should read "2010/0111041 A1 5/2010 Lim et al."

Signed and Sealed this
Sixteenth Day of January, 2024

Katherine Kelly Vidal
*Director of the United States Patent and Trademark Office*